US010063350B2

(12) United States Patent
Yin et al.

(10) Patent No.: US 10,063,350 B2
(45) Date of Patent: Aug. 28, 2018

(54) DEVICES FOR SENDING AND RECEIVING HYBRID AUTOMATIC REPEAT REQUEST INFORMATION FOR CARRIER AGGREGATION

(71) Applicant: Sharp Laboratories of America, Inc., Camas, WA (US)

(72) Inventors: Zhanping Yin, Vancouver, WA (US); Shohei Yamada, Osaka (JP); John Michael Kowalski, Camas, WA (US); Ahmad Khoshnevis, Portland, OR (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/826,989

(22) Filed: Aug. 14, 2015

(65) Prior Publication Data

US 2015/0358126 A1    Dec. 10, 2015

Related U.S. Application Data

(63) Continuation of application No. 13/423,089, filed on Mar. 16, 2012, now Pat. No. 9,112,693.

(51) Int. Cl.
*H04L 1/18* (2006.01)
*H04W 72/04* (2009.01)
(Continued)

(52) U.S. Cl.
CPC ............ *H04L 1/1861* (2013.01); *H04L 5/001* (2013.01); *H04L 5/0055* (2013.01); *H04L 5/0082* (2013.01); *H04L 5/1469* (2013.01); *H04W 72/0446* (2013.01); *H04L 5/0044* (2013.01)

(58) Field of Classification Search
CPC ............ H04W 72/04; H04W 72/406; H04W 72/0493; H04W 72/00; H04L 5/001; H04L 5/0053; H04L 1/1861; H04L 1/1864
See application file for complete search history.

(56) References Cited

U.S. PATENT DOCUMENTS

2011/0002276 A1    1/2011  Chen et al.
2011/0103243 A1    5/2011  Larsson et al.
(Continued)

OTHER PUBLICATIONS

Huawei, HiSilicon, "HARQ Timing Design for TDD Inter-Band CA With Different UL-DL Configurations," 3GPP TSG RAN WG1 Meeting #68, R1-120017, Feb. 2012.
(Continued)

*Primary Examiner* — Curtis A Alia
(74) *Attorney, Agent, or Firm* — Austin Rapp

(57) ABSTRACT

A User Equipment (UE) for sending Hybrid Automatic Repeat Request (HARQ) information is described. The UE includes a processor and instructions stored in memory that is in electronic communication with the processor. The UE determines a primary cell (PCell) configuration. The UE also determines a secondary cell (SCell) configuration. The UE further determines whether the PCell configuration specifies uplink (UL) and the SCell configuration specifies downlink (DL) for a subframe or whether the PCell configuration specifies DL and the SCell configuration specifies DL for the subframe. The UE additionally determines a HARQ Acknowledgement (HARQ-ACK) reporting subframe based on the PCell configuration if the PCell configuration specifies DL and the SCell configuration specifies DL for the subframe. The UE also sends SCell Physical Downlink Shared Channel (PDSCH) HARQ-ACK information in the HARQ-ACK reporting subframe.

9 Claims, 15 Drawing Sheets

(51) Int. Cl.
*H04L 5/00* (2006.01)
*H04L 5/14* (2006.01)

(56) References Cited

U.S. PATENT DOCUMENTS

| | | | |
|---|---|---|---|
| 2011/0103323 A1 | 5/2011 | Wang et al. | |
| 2011/0134774 A1 | 6/2011 | Pelletier et al. | |
| 2011/0141878 A1 | 6/2011 | Che et al. | |
| 2011/0176461 A1 | 7/2011 | Astely et al. | |
| 2011/0194443 A1 | 8/2011 | Li et al. | |
| 2011/0206014 A1 | 8/2011 | Lee et al. | |
| 2011/0243088 A1 | 10/2011 | Ahn et al. | |
| 2011/0249601 A1 | 10/2011 | Seo et al. | |
| 2011/0261714 A1 | 10/2011 | Pan et al. | |
| 2011/0310986 A1 | 12/2011 | Heo et al. | |
| 2012/0213170 A1* | 8/2012 | Choi | H04L 1/1861 370/329 |
| 2012/0307689 A1 | 12/2012 | Kim et al. | |
| 2013/0223295 A1 | 8/2013 | Choi et al. | |
| 2013/0294423 A1 | 11/2013 | Wang et al. | |

OTHER PUBLICATIONS

Huawei, HiSilicon, "Cross-Carrier Scheduling Design for TDD Inter-Band CA With Different UL-DL Configurations," 3GPP TSG RAN WG1 Meeting #68, R1-120018, Feb. 2012.
Ericsson, ST-Ericsson, "Remaining Issues in General Frame Work for Aggregation of Carriers With Different UL/DL Configurations," 3GPP TSG-RAN WG1 #68, R1-120070, Feb. 2012.
Ericsson, ST-Ericsson, "Cross-Carrier Scheduling in Aggregation of Carriers With Different UL/DL Configurations," 3GPP TSG-RAN WG1 #68, R1-120072, Feb. 2012.
CATT, "TDD Inter-Band Carrier Aggregation," 3GPP TSG-RAN WG1 #68, R1-120091, Feb. 2012.
Interdigital Communications, LLC, "Design Considerations for R11 TDD Inter-Band CA," 3GPP TSG-RAN WG1 #68, R1-120129, Feb. 2012.
Samsung, "UL HARQ-ACK Timing for TDD CA," 3GPP TSG-RAN WG1 #68, R1-120158, Feb. 2012.
Samsung, "DL HARQ-ACK Timing for TDD CA," 3GPP TSG-RAN WG1 #68, R1-120159, Feb. 2012.
Samsung, "Cross-carrier Scheduling of PUSCH for TDD CA," 3GPP TSG-RAN WG1 #68, R1-120160, Feb. 2012.
Samsung, "Need for Cross-Carrier Scheduling in Rel-11 TDD CA," 3GPP TSG-RAN WG1 #68, R1-120161, Feb. 2012.
Samsung, "Cross Subframe Scheduling of PDSCH," 3GPP TSG-RAN WG1 #68, R1-120162, Feb. 2012.
Intel Corporation, "Discussion on HARQ Feedback of TDD Inter-band Carrier Aggregation," 3GPP TSG-RAN WG1 #68, R1-120207, Feb. 2012.
Intel Corporation, "Open Issues of CA for Different TDD UL-DL Configurations," 3GPP TSG-RAN WG1 #68, R1-120208, Feb. 2012.
Panasonic, "Views on Open Issues on Inter-Band CA With Different TDD UL-DL Configurations," 3GPP TSG-RAN WG1 #68, R1-120219, Feb. 2012.
NEC Group, "Solution for Different Numbers Of UL-DL Configurations on Different Bands," 3GPP TSG-RAN WG1 #68, R1-120246, Feb. 2012.
Sharp, "PDSCH HARQ-ACK Report With LTE TDD Inter-Band CA," 3GPP TSG-RAN WG1 #68, R1-120274, Feb. 2012.
ZTE, "Views on Open Issues for Inter-Band CA With Different TDD UL-DL Configurations," 3GPP TSG-RAN WG1 #68, R1-120283, Feb. 2012.
Pantech, "View on Open Questions for CA With Different TDD Configurations," 3GPP TSG-RAN1 #68, R1-120316, Feb. 2012.
Research in Motion, UK Limited, "Design of HARQ and Scheduling Timing Linkage to Support Inter-band CA With Different TDD Configurations," 3GPP TSG-RAN WG1 #68, R1-120336, Feb. 2012.
Renesas Mobile Europe Ltd., "HARQ Procedure for Full Duplex Mode in CC Specific TDD Configuration," 3GPP TSG-RAN WG1 #67, R1-113888, Nov. 2011.
Renesas Mobile Europe Ltd., "HARQ Procedure for Half Duplex Mode in CC Specific TDD Configuration," 3GPP TSG-RAN WG1 #67, R1-113887, Nov. 2011.
Renesas Mobile Europe Ltd., "Discussion on Common Solution CC Specific TDD Configuration," 3GPP TSG-RAN WG1 #68, R1-120370, Feb. 2012.
LG Electronics, "Overall Structure for Full-Duplex Operation Based TDD CA With Different UL-DL Configurations," 3GPP TSG-RAN WG1 #68, R1-120420, Feb. 2012.
LG Electronics, "Overall Issues on Half-Duplex Operation Based TDD CA With Different UL-DL Configurations," 3GPP TSG RAN WG1 #68, R1-120421, Feb. 2012.
Alcatel-Lucent Shanghai Bell, Alcatel-Lucent, "On the Specification Impact of Supporting Different TDD UL-DL Configurations on Different Bands," 3GPP TSG RAN WG1 #68, R1-120483, Feb. 2012.
Qualcomm Incorporated, "Support of CA for Different TDD UL-DL Configurations," 3GPP TSG RAN WG1 #68, R1-120534, Feb. 2012.
Potevio, "Cross-Carrier Scheduling in Different Bands With Different TDD UL-DL Configurations," 3GPP TSG RAN WG1 #68, R1-120618, Feb. 2012.
ASUSTeK, "Open Issues for Different TDD UL-DL Configurations," 3GPP TSG RAN WG1 #68, R1-120665, Feb. 2012.
NTT DOMOCO, "PDCCH Enhancement for Different TDD UL-DL Configuration on Different Bands," 3GPP TSG RAN WG1 #68, R1-120670, Feb. 2012.
Nokia Siemens Networks, Nokia Corporation, "Views on Inter-Band CA With Different TDD Configurations on Different Bands," 3GPP TSG-RAN WG1 #68, R1-120708, Feb. 2012.
CATT, Huawei, HiSilicon, Qualcomm, ZTE, Intel, Potevio, "Way Forward on Inter-Band TDD CA in Rel-11," 3GPP TSG-RAN WG1 #68, R1-120872, Feb. 2012.
3GPP TS 36.211 V9.0.0, "Evolved Universal Terrestrial Radio Access (E-UTRA); Physical Channels and Modulation (Release 9)," Dec. 2009.
3GPP TS 36.213 V8.6.0, "Evolved Universal Terrestrial Radio Access (E-UTRA); Physical Layer Procedures (Release 8)," Mar. 2009.
3GPP TS 36.331 V9.1.0, "Evolved Universal Terrestrial Radio Access (E-UTRA) Radio Resource Control (RRC); Protocol Specification (Release 9)," Dec. 2009.
3GPP TS 36.212 V9.0.0, "Evolved Universal Terrestrial Radio Access (E-UTRA); Multiplexing and Channel Coding (Release 9)," Dec. 2009.
MCC Support, "Final Report of 3GPP TSG RAN WG1 #66 v1.0.0," 3GPP TSG RAN WG1 Meeting #66bis, R1-112886, Oct. 2011.
MCC Support, "Final Report of 3GPP TSG RAN WG1 #66bis v1.1.0," 3GPP TSG RAN WG1 Meeting #67, R1-114352, Nov. 2011.
MCC Support, "Final Report of 3GPP TSG RAN WG1 #67 v1.0.0," 3GPP TSG RAN WG1 Meeting #68, R1-120001, Feb. 2012.
MCC Support, "Draft Report of 3GPP TSG RAN WG1 #68 v0.1.0," 3GPP TSG RAN WG1 Meeting #68, R1-12xxxx, Mar. 2012.
Office Action issued for U.S. Appl. No. 13/423,089 dated Jun. 16, 2014.
Office Action issued for U.S. Appl. No. 13/423,089 dated Jan. 2, 2015.
Notice of Allowance issued for U.S. Appl. No. 13/423,089 dated Apr. 10, 2015.

* cited by examiner

DEVICES FOR SENDING AND RECEIVING HYBRID AUTOMATIC REPEAT REQUEST INFORMATION FOR CARRIER AGGREGATION

RELATED APPLICATIONS

This application is a continuation of U.S. patent application Ser. No. 13/423,089, entitled "DEVICES FOR SENDING AND RECEIVING HYBRID AUTOMATIC REPEAT REQUEST INFORMATION FOR CARRIER AGGREGATION," filed on Mar. 16, 2012, which is hereby incorporated by reference herein, in its entirety.

TECHNICAL FIELD

The present disclosure relates generally to communication systems. More specifically, the present disclosure relates to devices for sending and receiving hybrid automatic repeat request information for carrier aggregation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a fixed station that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
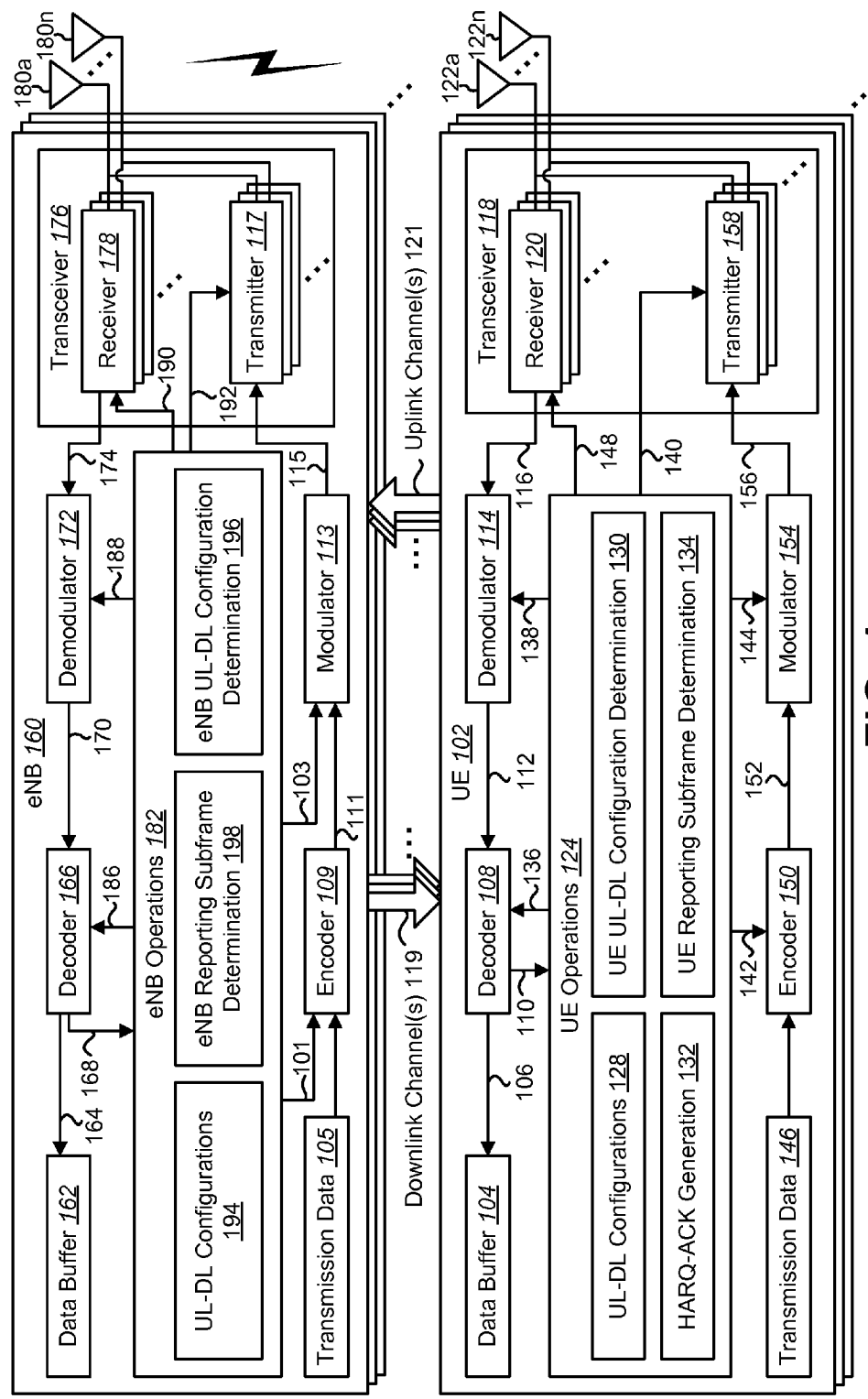
FIG. 1 is a block diagram illustrating one configuration of one or more evolved Node Bs (eNBs) and one or more User Equipments (UEs) in which systems and methods for sending and receiving Hybrid Automatic Repeat Request (HARQ) information may be implemented.

A UE for sending HARQ information is described. The UE includes a processor and instructions stored in memory that is in electronic communication with the processor. The UE determines a PCell configuration. The UE also determines an SCell configuration. The UE further determines whether the PCell configuration specifies uplink (UL) and the SCell configuration specifies downlink (DL) for a subframe or whether the PCell configuration specifies DL and the SCell configuration specifies DL for the subframe. The UE additionally determines a HARQ-ACK reporting subframe based on the PCell configuration if the PCell configuration specifies DL and the SCell configuration specifies DL for the subframe. The UE also sends SCell PDSCH HARQ-ACK information in the HARQ-ACK reporting subframe. The UE may generate the SCell PDSCH HARQ-ACK information corresponding to the subframe. The UE may determine the HARQ-ACK reporting subframe based on a selected UL-DL configuration and a subframe number if the PCell configuration specifies UL and the SCell configuration specifies DL for the subframe.

An SCell and a PCell may include aggregated carriers. The PCell and the SCell may have a same periodicity or differing periodicities.

The selected UL-DL configuration may specify a PDSCH HARQ-ACK association. The selected UL-DL configuration may be selected from UL-DL configurations 0-6. The selected UL-DL configuration may be selected based on at least one of payload balancing and HARQ-ACK delay.

An eNB for receiving HARQ information is also described. The eNB includes a processor and instructions stored in memory that is in electronic communication with the processor. The eNB determines a PCell configuration corresponding to a UE. The eNB also determines an SCell configuration corresponding to the UE. The eNB further determines whether the PCell configuration specifies UL and the SCell configuration specifies DL for a subframe or whether the PCell configuration specifies DL and the SCell configuration specifies DL for the subframe. The eNB additionally determines a HARQ-ACK reporting subframe based on the PCell configuration if the PCell configuration specifies DL and the SCell configuration specifies DL for the subframe. The eNB also receives SCell PDSCH HARQ-ACK information in the HARQ-ACK reporting subframe. The eNB may determine the HARQ-ACK reporting subframe based on a selected UL-DL configuration and a subframe number if the PCell configuration specifies UL and the SCell configuration specifies DL for the subframe.

An SCell and a PCell may include aggregated carriers. The PCell and the SCell may have a same periodicity or differing periodicities.

The selected UL-DL configuration may specify a PDSCH HARQ-ACK association. The selected UL-DL configuration may be selected from UL-DL configurations 0-6. The selected UL-DL configuration may be selected based on at least one of the group consisting of payload balancing and HARQ-ACK delay.

A method for sending HARQ information by a UE is also described. The method includes determining a PCell configuration. The method also includes determining an SCell configuration. The method further includes determining whether the PCell configuration specifies UL and the SCell configuration specifies DL for a subframe or whether the PCell configuration specifies DL and the SCell configuration specifies DL for the subframe. The method additionally includes determining a HARQ-ACK reporting subframe based on the PCell configuration if the PCell configuration specifies DL and the SCell configuration specifies DL for the subframe. The method also includes sending SCell PDSCH HARQ-ACK information in the HARQ-ACK reporting subframe.

A method for receiving HARQ information by an eNB is also described. The method includes determining a PCell configuration corresponding to a UE. The method also includes determining an SCell configuration corresponding to the UE. The method further includes determining whether the PCell configuration specifies UL and the SCell configuration specifies DL for a subframe or whether the PCell configuration specifies DL and the SCell configuration specifies DL for the subframe. The method additionally includes determining a HARQ-ACK reporting subframe based on the PCell configuration if the PCell configuration specifies DL and the SCell configuration specifies DL for the subframe. The method also includes receiving SCell PDSCH HARQ-ACK information in the HARQ-ACK reporting subframe.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency band) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a PDSCH. "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe devices for sending and receiving HARQ information for carrier aggregation. For example, PDSCH HARQ-ACK reporting for carrier aggregation (e.g., inter-band carrier aggregation) with different Time-Division Duplexing (TDD) UL-DL configurations is described.

In accordance with the systems and methods disclosed herein, different TDD UL-DL configurations may be used for inter-band carrier aggregation. In other words, the cells or component carriers (CCs) in different bands may have different UL-DL configurations. Carrier aggregation refers to the concurrent utilization of more than one carrier. In one example, carrier aggregation may be used to increase the effective bandwidth available to a UE. One type of carrier aggregation is inter-band carrier aggregation. In inter-band carrier aggregation, multiple carriers from multiple bands may be aggregated. For example, a carrier in a first band may be aggregated with a carrier in a second band. As used herein, the term "concurrent" and variations thereof may denote that at least two events may overlap each other in time, and may or may not mean that the at least two events begin and/or end at precisely the same time.

In 3GPP Release-10 specifications, uplink reporting is carried only on a PCell. However, for inter-band carrier aggregation with different TDD UL-DL configurations, the uplink reporting of an SCell with a different UL-DL configuration may not be dropped. Therefore, the systems and methods disclosed herein provide some rules for aggregating and reporting of Acknowledgement/Negative Acknowledgement (ACK/NACK) for downlink transmission for inter-band carrier aggregation with different TDD UL-DL configurations.

In some implementations of the systems and methods disclosed herein, one or more assumptions may be made. For example, it may be assumed that a Physical Uplink Control Channel (PUCCH) is transmitted on a PCell only, and that no HARQ-ACK table may be utilized beyond what is defined in 3GPP Releases 8, 9 and 10. It may also be assumed that the PCell keeps the same timing as in 3GPP Releases 8, 9 and 10, which includes PDSCH HARQ-ACK timing, Physical Uplink Shared Channel (PUSCH) scheduling and PUSCH HARQ-ACK timing.

As used herein, the term "configuration" may refer to an UL-DL configuration. An UL-DL configuration specifies whether each subframe within a radio frame is an UL subframe, a DL subframe or a special subframe. More detail regarding UL-DL configurations is given in connection with Table (1) below. A "PCell configuration" may refer to an UL-DL configuration that corresponds to a PCell. For example, a PCell configuration is an UL-DL configuration applied by the eNB and UE for communications in the PCell. The PCell configuration may be signaled to a UE by an eNB in a SystemInformationBlockType1 (SIB1). An "SCell configuration" may refer to an UL-DL configuration that corresponds to an SCell. For example, an SCell configuration is an UL-DL configuration applied by the eNB and UE for communications in an SCell. An SCell configuration may be signaled to a UE by an eNB in a SIB1. In some implementations, the PDSCH HARQ-ACK reports for an SCell may follow the PCell configuration if the set of DL subframes indicated by the SCell configuration is a subset of the DL subframes indicated by the PCell configuration.

PDSCH HARQ-ACK may be reported on the uplink. In one approach, the PCell configuration may be selected as a reference configuration. SCell PDSCH HARQ-ACK may be mapped to a PCell UL subframe allocation. An "UL subframe allocation" may refer to one or more subframes that are configured for UL transmissions. For example, a PCell UL subframe allocation may specify one or more UL subframes in accordance with the PCell configuration. A "DL subframe allocation" may refer to one or more subframes that are configured for DL transmissions. For example, a PCell DL subframe allocation may specify one or more DL subframes in accordance with the PCell configuration.

The systems and methods disclosed herein provide approaches for PDSCH HARQ-ACK reporting on the uplink if the set of DL subframes indicated by an SCell configuration is not a subset of DL subframes indicated by a PCell configuration. However, the systems and methods disclosed herein do not require the addition of any new HARQ-ACK timings to the existing PDSCH HARQ-ACK association table (as illustrated in Table (2) below). Instead, HARQ-ACK timing may be selected from the table so that the timing can be applied to all possible SCell configurations.

The systems and methods disclosed herein support different TDD UL-DL configurations on different bands. Carrier aggregation with different TDD configurations may be referred to as "inter-band carrier aggregation" herein.

The systems and methods disclosed herein provide approaches for PDSCH HARQ-ACK reporting on the uplink. No new HARQ-ACK timings may be added to the existing PDSCH HARQ-ACK association table, even if the set of DL subframes indicated by the SCell configuration is not a subset of the DL subframes indicated by the PCell configuration. Instead, HARQ-ACK timing may be selected from the table so that the timing can be applied to all possible SCell configurations. The systems and methods disclosed herein may provide an approach that is compliant with all current Radio Layer 1 (RAN1) agreements.

The SCell may follow the PCell timing in subframes where both the PCell and the SCell have a DL subframe. In a subframe where the SCell has a DL subframe and the PCell has an UL subframe, the SCell timing may be selected from the existing HARQ-ACK table such that different subframes may choose an association mapping from different UL-DL configurations. They also may be selected such that the HARQ-ACK bits are more evenly distributed into all UL subframe allocations in the PCell.

The systems and methods disclosed herein may be applied to any number of bands and to any UL-DL combinations. In accordance with the systems and methods disclosed herein, the PCell configuration may be a reference configuration. Furthermore, no higher layer signaling may be needed to provide a reference configuration for the SCell.

If a PCell configuration specifies DL and an SCell configuration specifies DL for a subframe, the SCell downlink PDSCH association with HARQ-ACK transmission may follow the PCell configuration. For example, a HARQ-ACK reporting subframe may be determined based on the PCell configuration (e.g., the PDSCH HARQ-ACK associations for the PCell configuration). If the PCell configuration specifies UL and the SCell configuration specifies DL for a subframe, the SCell downlink association with HARQ-ACK transmission may be selected from a set of downlink associations with HARQ-ACK transmission based on the subframe number. For example, a HARQ-ACK reporting subframe may be determined based on a selected UL-DL configuration and a subframe number. More specifically, a selected UL-DL configuration may indicate one or more selected PDSCH HARQ-ACK associations or timings, for example. For clarity, a (PDSCH) HARQ-ACK reporting subframe is a subframe indicated by an UL-DL configuration (e.g., PDSCH HARQ-ACK association) for reporting HARQ-ACK information.

In some implementations, the frame structure applied herein may conform to the LTE-TDD frame structure given in 3GPP TS 36.211. More detail regarding LTE-TDD frame structure is given below in connection with FIG. 4. UL-DL configurations 0-6 are given below in Table (1) (from Table 4.2-2 in 3GPP TS 36.211). UL-DL configurations with both 5 ms and 10 ms downlink-to-uplink switch-point periodicity may be supported. In particular, seven UL-DL configurations are specified in 3GPP specifications, as shown in Table (1) below. In Table (1), "D" denotes a downlink subframe, "S" denotes a special subframe and "U" denotes an UL subframe.

TABLE (1)

| UL-DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

The UL-DL configuration may be part of a SIB1, defined by the Information Element (IE) TDD-Config, which includes a subframe assignment and a specialSubframePatterns parameter. The SIB1 is transmitted (by an eNB, for example) on a broadcast control channel as a logical channel.

In Release-10 carrier aggregation, the same TDD UL-DL configuration is required for all aggregated cells. Furthermore, the TDD UL-DL configuration is obtained from a PCell only. As given in 3GPP TS 36.331, Section 5.2.2.1, for example, "[t]he UE applies the system information acquisition and change monitoring procedures for the PCell only. For an SCell, E-UTRAN provides, via dedicated signaling, all system information relevant for operation in RRC_CONNECTED when adding the SCell. Upon change of the relevant system information of a configured SCell, E-UTRAN releases and subsequently adds the concerned SCell, which may be done with a single RRCConnectionReconfiguration message . . . . E-UTRAN may configure via dedicated signaling different parameter values than the ones broadcast in the concerned SCell." RadioResourceConfigCommonSCell is used for cell specific (common) information and RadioResourceConfigDedicatedSCell is used for UE specific (dedicated) information. These are included in an RRCConnectionReconfiguration message. TDD-Config is a parameter to that specifies the TDD UL-DL configuration, which is informed by the SIB1 or RadioResourceConfigCommon on the PCell and may be referred to as PCell SIB1 configuration or PCell configuration and may be applied to all serving cells.

The systems and methods disclosed herein support different TDD UL-DL configurations on different bands in carrier aggregation. Carrier aggregation with different TDD configurations may also be referred to as inter-band carrier aggregation. Enabling carrier aggregation in a heterogeneous network scenario is one benefit of different TDD UL-DL configurations. In a heterogeneous network, a pico-cell in one band may have a very different UL-DL traffic load than a macro-cell in another band, thus requiring different UL-DL configurations. The PCell may be configured with the macro-cell or the pico-cell, for example. The TDD UL-DL configuration for each SCell may be informed by RadioResourceConfigCommonSCell, which is also referred to as SCell SIB1 configuration or SCell configuration.

Carrier aggregation may assume that the same eNB scheduler manages communication resources for the PCell and SCell(s). Thus, the scheduler may know the actual configuration of each cell. The UEs may be informed (by an eNB, for example) of the actual UL-DL configuration of each aggregated cell, particularly if a cell has a different UL-DL configuration from the PCell.

In some implementations, the systems and methods disclosed herein may operate in accordance with one or more procedures that are given as follows. A UE may be informed (by an eNB, for example) of an UL-DL configuration for each aggregated CC in order to support different TDD UL-DL configurations on different bands. CCs in the same band may have the same UL-DL configuration. Additionally or alternatively, no new UL-DL configurations may be utilized.

A PUCCH may only be transmitted on the PCell. In some implementations, no new HARQ-ACK timing tables beyond those already defined in 3GPP Releases 8, 9 and 10 may be utilized. However, a new HARQ-ACK timing table may be utilized if there are cases where additional timing is needed or is beneficial.

The PCell may keep the same timing as given in 3GPP Releases 8, 9 and 10, which includes PDSCH HARQ-ACK timing, PUSCH scheduling and PUSCH HARQ-ACK timing. Furthermore, the SCell may follow the PCell SIB1 configuration if the set of DL subframes indicated by the SCell SIB1 configuration is a subset of the DL subframes indicated by the PCell SIB1 configuration. PCell SIB1 configuration may be referred to as a "PCell configuration," and SCell SIB1 configuration may be referred to as "SCell configuration" for simplicity.

More detail regarding PDSCH HARQ-ACK reporting with inter-band carrier aggregation with different TDD configurations in accordance with the systems and methods disclosed herein is given hereafter. PDSCH HARQ-ACK is transmitted on uplink (e.g., in an UL subframe) by either a PUCCH or PUSCH. In 3GPP Release-8, the ACK/NACK bits from a downlink association set are reported on a PUCCH or on a PUSCH if a PUSCH is allocated for the UE in the UL subframe. The downlink association set depends on the TDD UL-DL configuration, as given in Table (2) below (from Table 10.1.3.1-1 of TS 36.213). In Release-10 with carrier aggregation, the ACK/NACK bits of multiple serving cells are multiplexed and/or bundled, and are reported on the PCell only with a PUCCH or PUSCH transmission. It should be noted that the table of downlink association set index for TDD (Table (2)) may be referred to as a PDSCH HARQ-ACK table, PDSCH HARQ-ACK association table or PDSCH HARQ-ACK mapping table. It should also be noted that PDSCH HARQ-ACK timing may be based on one or more PDSCH HARQ-ACK associations. The indexes in the association set may be referred to as entries of the PDSCH HARQ-ACK table. A downlink association set index for TDD may be defined in Table (2) as K: $\{k_0, k_1, \ldots, k_{M-1}\}$, where M is a number of elements in the set K.

TABLE (2)

| UL-DL Configuration Number | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |

TABLE (2)-continued

| UL-DL Configuration Number | Subframe n | | | | | | | | | |
|---|---|---|---|---|---|---|---|---|---|---|
| | 0 | 1 | 2 | 3 | 4 | 5 | 6 | 7 | 8 | 9 |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

PDSCH HARQ-ACK may be reported on the uplink. PDSCH HARQ-ACK reporting may be applied to full duplex and half duplex operation. In one approach, the PCell configuration is always used as a reference configuration. SCell PDSCH HARQ-ACK may be mapped to PCell UL subframe allocations with a regional mapping. This approach ensures that the same timing is maintained by PCell.

In a first procedure, all subframes in an SCell may follow a reference configuration. More detail regarding the first procedure is given in connection with FIG. 8 below. In a second procedure, SCell timing may be determined on subframe basis. In this second procedure, the timing may be determined based on the type of subframe. In non-conflicting subframes where both PCell and SCell have DL subframe allocations, the SCell may follow the PCell timing. Thus, the HARQ-ACK of PDSCHs of the PCell and the SCell in the same DL subframe may be reported in the same UL subframe. This is consistent with cross-carrier scheduling such that the HARQ-ACK feedback of cross-carrier scheduled subframes are associated with the same timing as the scheduling cell. In conflicting subframes where the PCell configuration indicates UL and the SCell configuration indicates DL, the subframe on the SCell may be mapped to a PCell UL subframe.

Details regarding a first approach in the second procedure for mapping the SCell subframe to a PCell UL subframe are given as follows. In this first approach, the conflicting subframes may follow a general rule and map the PDSCH HARQ-ACK into the nearest UL subframe on PCell that is at least 4 transmission time intervals (TTIs) away from the conflicting DL subframe on SCell. For example, for a conflicting subframe with PCell UL and an SCell DL subframe allocation in subframe number n, the HARQ-ACK is mapped to the first UL subframe on PCell that is greater or equal to (n+4). In some cases, this may introduce new association timing that is not included in the existing timing table. It may also lead to a more unbalanced HARQ-ACK payload in different UL reports.

Details regarding a second approach in the second procedure for mapping the SCell subframe to a PCell UL subframe are given as follows. In this second approach, the conflicting subframes may follow a reference configuration. The reference configuration may be derived as in the first procedure described below in connection with FIG. 8. Additionally or alternatively, the reference configuration may be signaled by higher layer signaling (e.g., Radio Resource Control (RRC) signaling). This second approach also faces similar issues as the first procedure described above. For the same conflicting subframe, the mapping may be different for different SCell configurations. This second approach may still have a crossover PDSCH HARQ-ACK report. Higher layer signaling of a reference configuration may cause delay and service interruption with SCell activation and deactivation. This may also lead to a more unbalanced HARQ-ACK payload in different UL subframes.

More detail regarding a third approach in the second procedure is given hereafter. In this third approach, a regional mapping may be applied. The PCell configuration may be applied as the reference configuration, and all PCell timing may be included in the regional mapping group. A potentially conflicting subframe with PCell UL and SCell DL may be mapped to a corresponding UL subframe on the PCell by a regional group. Thus, a superset mapping table is derived so that it can be applicable to all cells and TDD UL-DL configurations. This mapping approach can be applied to any number of TDD UL-DL configurations and any combination of configurations. However, in some cases, it introduces new association timing that is not included in the existing timing table.

The systems and methods described herein provide a fourth approach in the second procedure for mapping the conflicting subframes with a PCell UL subframe allocation and an SCell DL subframe allocation. In this fourth approach, only the PCell configuration may be used as the reference configuration.

With a given PCell configuration, for each potentially conflicting subframe with a PCell UL subframe allocation and an SCell DL subframe allocation, an association mapping may be derived from all possible SCell configurations. For a given PCell configuration, the potentially conflicting subframes with a PCell UL subframe allocation and an SCell DL subframe allocation are all conflicting subframes between the given PCell configuration and the TDD UL-DL configuration five (e.g., the configuration with minimum UL subframe allocations).

Thus, for any SCell configuration, the set of conflicting subframes with a PCell UL subframe allocation and an SCell DL subframe allocation may be a subset of the potentially conflicting subframes with a PCell UL subframe allocation and an SCell DL subframe allocation. Moreover, the set of potentially conflicting subframes (e.g., possibly conflicting subframes) with a PCell UL subframe allocation and an SCell DL subframe allocation may be derived for each periodicity (e.g., 5 ms and 10 ms) of TDD UL-DL configurations. In a 5 ms periodicity case, the set of potentially conflicting subframes with a PCell UL subframe allocation and an SCell DL subframe allocation may be derived based on configuration zero (e.g., "0") on the PCell and configuration five (e.g., "5") on the SCell. In a 10 ms periodicity case, the set of potentially conflicting subframes with a PCell UL subframe allocation and an SCell DL subframe allocation may be derived by configuration three (e.g., "3") on the PCell and configuration five on the SCell.

For each potentially conflicting subframe with a PCell UL subframe allocation and an SCell DL subframe allocation, the association mapping may be selected from the existing HARQ-ACK association table (e.g., Table (2) above). The selection may be based on (e.g., optimized based on) one or more of HARQ-ACK payload balancing and HARQ-ACK delay. The selected association mapping may be applied to all SCell configurations, if applicable. The associations of different potentially conflicting subframes may be selected from different TDD configurations. Since this association mapping is fixed to all SCell configurations, no reference configuration and no higher layer signaling may be needed.

Table (3) below lists potentially conflicting subframes with a PCell UL subframe allocation and an SCell DL subframe allocation for TDD PCell with 5 ms periodicity. Table (3) also lists the existing associations and examples of selected UL-DL configurations (e.g., PDSCH HARQ-ACK associations). Table (4) lists the applicability of the conflicting subframe with different PCell configurations with 5 ms periodicity. Table (5) shows an example of a selected downlink association index for potentially conflicting subframes when a PCell configuration has a 5 ms periodicity. More detail is given in connection with FIG. 9 below.

TABLE (3)

| Potentially Conflicting Subframes (PCell UL, SCell DL) | Existing Table PDSCH HARQ-ACK Associations | Example of Selected UL-DL Configurations (Associations) |
|---|---|---|
| Subframe 3 | Subframe 7 (configuration 2) Subframe 2 of the next radio frame (configuration 5) | Follow configuration 2: report on subframe 7 |

TABLE (3)-continued

| Potentially Conflicting Subframes (PCell UL, SCell DL) | Existing Table PDSCH HARQ-ACK Associations | Example of Selected UL-DL Configurations (Associations) |
|---|---|---|
| Subframe 4 | Subframe 2 of the next radio frame (configurations 2, 4, 5) Subframe 8 (configuration 1) | Follow configuration 1: report on subframe 8 |
| Subframe 7 | Subframe 2 of the next radio frame (configuration 5) Subframe 3 of the next radio frame (configurations 3, 4) | Follow configuration 5: report on subframe 2 of the next radio frame |
| Subframe 8 | Subframe 2 of the next radio frame (configurations 2, 5) Subframe 3 of the next radio frame (configurations 3, 4) | Follow configurations 3 and 4: report on subframe 3 of the next radio frame |
| Subframe 9 | Subframe 3 of the next radio frame (configurations 1, 4) Subframe 4 of the next radio frame (configurations 3, 6) Subframe 7 of the next radio frame (configuration 2) Subframe 2 of the radio frame after the next radio frame (configuration 5) | Follow configurations 3 and 6: report on subframe 4 of the next radio frame |

Table (4) below illustrates the applicability of potentially conflicting subframes with a PCell UL subframe allocation and an SCell DL subframe allocation for a TDD PCell with 5 ms periodicity. For convenience, "Configuration" is abbreviated as "Config" in Table (4). In Table (4), "Y" denotes "Yes" (that potentially conflicting subframes with a PCell UL subframe allocation and an SCell DL subframe allocation are applicable for a TDD PCell with 5 ms periodicity).

TABLE (4)

| PCell Config | SCell Config | Subframe 3 | Subframe 4 | Subframe 7 | Subframe 8 | Subframe 9 |
|---|---|---|---|---|---|---|
| 0 | 5 | Y | Y | Y | Y | Y |
|   | 4 |   | Y | Y | Y | Y |
|   | 3 |   |   | Y | Y | Y |
|   | 2 | Y | Y |   | Y | Y |
|   | 1 |   | Y |   |   | Y |
|   | 6 |   |   |   |   | Y |
| 1 | 5 | Y |   | Y | Y |   |
|   | 4 |   |   | Y | Y |   |
|   | 3 |   |   | Y | Y |   |
|   | 2 | Y |   |   | Y |   |
| 2 | 5 |   |   | Y |   |   |
| 6 | 5 | Y | Y | Y | Y |   |
|   | 4 |   | Y | Y | Y |   |
|   | 3 |   |   | Y | Y |   |
|   | 1 |   | Y |   |   |   |
|   | 2 | Y | Y |   | Y |   |

Table (5) below illustrates a selected downlink association index for potentially conflicting subframes for a TDD PCell with 5 ms periodicity. In particular, the index values k are given for each UL-DL configuration number and for each subframe n. In this case, the index value k indicates a difference in number of subframes between subframes having a HARQ-ACK association. Furthermore, the row denoted "HARQ-ACK association to PDSCH of potentially conflicting subframe" gives the actual subframe number of the subframe associated with the subframe n for HARQ-ACK. Selected index values for k are denoted with an asterisk (*). For example, subframe n=2 in UL-DL configuration 5 has a selected index value k=5 in accordance with the systems and methods disclosed herein. This indicates that subframe n=2 in UL-DL configuration five has a HARQ-ACK association to the PDSCH of subframe 7 of the last (e.g., preceding) radio frame, which is a potentially conflicting subframe.

In a conflicting subframe with a PCell UL subframe allocation and an SCell DL subframe allocation, the selected PDSCH HARQ-ACK association may be applied if applicable as listed in Table (4) and Table (7). Since the same association is used for a given subframe and for all SCell configurations, there may be no need to signal an extra reference configuration. The association mapping is independent of the SCell configuration and combinations of TDD UL-DL configurations.

The selected associations in the tables provided herein illustrate examples of selecting PDSCH HARQ-ACK associations from existing table entries. Other associations may also be selected instead of the example selected associations illustrated. In one case, for example, the selected associations from existing PDSCH HARQ-ACK table may be applied to all SCell configurations and combinations of configurations. In another case, for example, the selected associations for an SCell configuration may depend on the

TABLE (5)

| UL-DL Configuration Number | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4* | — |
| 2 | — | — | 8, 7, 4, 6 | — | — | — | — | 8, 7, 4*, 6 | — | — |
| 3 | — | — | 7, 6, 11 | 6, 5* | 5*, 4 | — | — | — | — | — |
| 4 | — | — | 12, 8, 7, 11 | 6, 5*, 4, 7 | — | — | — | — | — | — |
| 5 | — | — | 13, 12, 9, 8, 7, 5*, 4, 11, 6 | — | — | — | — | — | — | — |
| 6 | — | — | 7 | 7 | 5* | — | — | 7 | 7 | — |
| HARQ-ACK association to PDSCH of potentially conflicting subframe | | | 7 of last radio frame | 8 of last radio frame | 9 of last radio frame | | | 3 of same radio frame | 4 of same radio frame | |

When the PCell has a periodicity of 10 ms, only subframe 2 and subframe 3 may be potentially conflicting subframes with a PCell UL subframe allocation and an SCell DL subframe allocation as listed in Table (6). Table (7) lists the applicability of the potentially conflicting subframes for PCell configurations with 10 ms periodicity. Table (8) illustrates one example of the selected downlink association index for potentially conflicting subframes when a PCell has 10 ms periodicity. In some implementations, to better balance the HARQ-ACK payload, an exception case may be defined if configuration 3 is configured on the PCell. Instead of mapping to the UL subframe 2 of the next radio frame, the PDSCH transmissions in potentially conflicting subframe 3 and subframe 4 may be associated with the UL subframe 3 and subframe 4 of the next radio frame on PCell.

In some implementations of the systems and methods disclosed herein, one or more of the following rules may be applied for a PCell configuration, for any SCell TDD configuration and for combinations of configurations. An SCell may follow the PCell timing in non-conflicting subframes (e.g., subframes where both the PCell and the SCell have DL subframe allocations). In a conflicting subframe where the PCell has DL subframe allocation and an SCell has UL subframe allocation, no PDSCH HARQ-ACK is needed for the SCell. Thus, PDSCH HARQ-ACK on the PCell follows its own timing.

combination of PCell and SCell configurations. Thus, the selected associations of one PCell and SCell combination may be different from another PCell and SCell combination. However, as long as the selected associations are specified for each combination and are used whenever applicable, there is no need for extra higher layer signaling, such as RRC signaling.

Table (6) below illustrates potentially conflicting subframes with a PCell UL subframe allocation and an SCell DL subframe allocation for TDD PCell with 10 ms periodicity.

TABLE (6)

| Potentially Conflicting Subframes (PCell UL, SCell DL) | Example of Selected Associations |
|---|---|
| Subframe 3 | Follow configuration 5: report on subframe 2 of the next radio frame |
| Subframe 4 | Follow configurations 4 and 5: report on subframe 2 of the next radio frame |

Table (7) below illustrates the applicability of potentially conflicting subframes with a PCell UL subframe allocation and an SCell DL subframe allocation for a TDD PCell with 10 ms periodicity. In Table (7), "Y" denotes "Yes" (that potentially conflicting subframes with a PCell UL subframe allocation and an SCell DL subframe allocation are applicable for a TDD PCell with 10 ms periodicity).

TABLE (7)

| PCell Configuration | SCell Configuration | Subframe 3 | Subframe 4 |
|---|---|---|---|
| 3 | 5 | Y | Y |
|   | 4 |   | Y |
|   | 2 | Y | Y |
|   | 1 |   | Y |
| 4 | 5 | Y |   |
|   | 2 | Y |   |

Table (8) below illustrates one example of a selected downlink association index for potentially conflicting subframes for TDD PCell with 10 ms periodicity. In particular, the index values k are given for each UL-DL configuration number and for each subframe n. In this case, the index value k indicates a difference in number of subframes between subframes having a HARQ-ACK association. Furthermore, the row denoted "HARQ-ACK association to PDSCH of potentially conflicting subframe" gives the actual subframe number of the subframe associated with the subframe n for HARQ-ACK. Selected index values for k are denoted with an asterisk (*). For example, subframe n=2 in UL-DL configuration 4 has a designated index value k=8 in accordance with the systems and methods disclosed herein. This indicates that subframe n=2 in UL-DL configuration 4 has a HARQ-ACK association to the PDSCH of subframe 4 of the last (e.g., preceding) radio frame, which is a potentially conflicting subframe.

TABLE (8)

| UL-DL Configuration Number | Subframe n | | | | | | | | | |
|---|---|---|---|---|---|---|---|---|---|---|
|  | 0 | 1 | 2 | 3 | 4 | 5 | 6 | 7 | 8 | 9 |
| 3 | — | — | 7, 6, 11 | 6, 5 | 5, 4 | — | — | — | — | — |
| 4 | — | — | 12, 8*, 7, 11 | 6, 5, 4, 7 | — | — | — | — | — | — |
| 5 | — | — | 13, 12, 9*, 8*, 7, 5, 4, 11, 6 | — | — | — | — | — | — | — |
| HARQ-ACK association to PDSCH of potentially conflicting subframe |  |  | Subframes 3 and 4 of the last radio frame |  |  |  |  |  |  |  |

In some implementations, the systems and methods disclosed herein may provide one or more of the benefits described as follows. The PCell may be the only reference configuration. Thus, no higher layer signaling may be needed to provide a reference configuration for an SCell. Associations may be selected from an existing PDSCH HARQ-ACK timing table. Accordingly, no new PDSCH HARQ-ACK timing may need to be defined. Simple and unified association mapping may be provided based on the PCell configuration only. More specifically, the mapping may be fixed based on the PCell periodicity only. The systems and methods disclosed herein may be consistent with cross-carrier scheduling concepts of timing following the scheduling cell. All PCell ULs may be utilized. Furthermore, the HARQ-ACK payload may be well balanced in all UL subframes the PCell. The systems and methods disclosed herein may be applied to any number of bands and any UL-DL combinations. The PCell and SCell may have the same or different periodicities. The systems and methods disclosed herein may be applied to both full duplex and half duplex operations. No mapping change may be needed with SCell activation or deactivation. Furthermore, no mapping change with SCell re-configuration may be needed.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more eNBs 160 and one or more UEs 102 in which systems and methods for sending and receiving HARQ information may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include UL-DL configurations 128, a UE UL-DL configuration determination module 130, a HARQ-ACK generation module 132 and a UE reporting subframe determination module 134.

The UL-DL configurations 128 may specify a set of UL-DL configurations that may be used for communication between the UE 102 and the eNB 160. Examples of UL-DL configurations include the UL-DL configurations 0-6 illustrated in Table (1) above. The UL-DL configurations 128 may specify UL and DL subframes for communication with the eNB(s) 160. For example, the UL-DL configurations 128 may indicate DL subframes for the UE 102 to receive information from the eNB 160 and may indicate UL subframes for the UE 102 to transmit information to the eNB 160. For proper communication on a cell, the UE 102 and the eNB 160 may apply the same UL-DL configuration 128 on the same cell. However, different UL-DL configurations 128 may be applied on different cells (e.g., PCell and SCell(s)).

The UL-DL configurations 128 may also indicate PDSCH HARQ-ACK associations. A PDSCH HARQ-ACK association may specify a particular (PDSCH HARQ-ACK) timing for sending HARQ-ACK information corresponding to a PDSCH. For example, the HARQ-ACK generation module 132 may generate HARQ-ACK (e.g., ACK/NACK) information corresponding to a PDSCH based on whether data in the PDSCH was correctly received or not. A PDSCH HARQ-ACK association may specify a reporting subframe in which the UE 102 reports (e.g., transmits) the HARQ-ACK information corresponding to the PDSCH. The reporting subframe may be determined based on the subframe that includes the PDSCH.

The UE UL-DL configuration determination module 130 may determine which of the UL-DL configuration(s) 128 for the UE 102 to apply for one or more cells. For example, the UE 102 may receive one or more SIB1 indicating UL-DL configuration(s) 128 for a PCell and for one or more SCells. For instance, a PCell and an SCell may be utilized in carrier aggregation. The UE UL-DL configuration determination module 130 may determine which UL-DL configuration 128 is assigned to the PCell and which UL-DL configuration 128 is assigned to the SCell. The UL-DL configurations 128 for the PCell and SCell(s) may be the same or different.

The UE reporting subframe determination module 134 may determine a reporting subframe for sending HARQ-ACK information. For example, the UE reporting subframe determination module 134 may determine a HARQ-ACK reporting subframe in which the UE 102 sends SCell PDSCH HARQ-ACK information (e.g., PDSCH HARQ-ACK information corresponding to an SCell).

The HARQ-ACK reporting subframe determination may be based on whether a conflicting subframe occurs between an UL-DL configuration 128 corresponding to a PCell (e.g., PCell configuration) and an UL-DL configuration 128 corresponding to an SCell (e.g., SCell configuration). For example, the UE reporting subframe determination module 134 may determine whether a PCell configuration specifies UL and an SCell configuration specifies DL for a subframe or whether the PCell configuration specifies DL and the SCell configuration specifies DL for the subframe.

If the PCell and SCell both specify DL for a subframe (that includes an SCell PDSCH, for example), then the UE reporting subframe determination module 134 may determine a HARQ-ACK reporting subframe based on the PCell configuration (for sending SCell PDSCH HARQ-ACK information, for example). If the PCell specifies UL and the SCell specifies DL for a subframe (that includes an SCell PDSCH, for example), then the UE reporting subframe determination module 134 may determine a HARQ-ACK reporting subframe based on a selected UL-DL configuration 128 and a subframe number corresponding to the subframe including the PDSCH, for example. For instance, Table (2) above (e.g., the PDSCH HARQ-ACK (association) table) gives the location of a corresponding PDSCH by the index set K: $\{k_0, k_1, \ldots, k_{M-1}\}$, for a subframe (e.g., UL subframe) number n, where the HARQ-ACK of a PDSCH in subframe n-k (e.g., n-$k_1$) is reported in UL subframe n. The UE 102 may send the SCell HARQ-ACK information in the determined HARQ-ACK reporting subframe.

The UE operations module 124 may provide information 148 to the one or more receivers 120. For example, the UE operations module 124 may inform the receiver(s) 120 when or when not to receive transmissions based on the UL-DL configurations 128.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or control information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. In some configurations, this may be based on a UL-DL configuration 128. For instance, the one or more transmitters 158 may transmit during an UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data that may be used by the eNB operations module 182 to perform one or more operations.

In general, the eNB operations module 182 may enable the eNB 160 to communicate with the one or more UEs 102. The eNB operations module 182 may include UL-DL configurations 194, an eNB reporting subframe determination module 198 and an eNB UL-DL configuration determination module 196.

The UL-DL configurations 194 may specify a set of UL-DL configurations that may be used for communication between the eNB 160 and the UE(s) 102. Examples of UL-DL configurations 194 include the UL-DL configurations 0-6 illustrated in Table (1) above. The UL-DL configurations 194 may specify UL and DL subframes for communication with the UE(s) 102. For example, the UL-DL configurations 194 may indicate DL subframes for the eNB 160 to send information to the UE(s) 102 and may indicate UL subframes for the eNB 160 to receive information from the UE(s) 102. For proper communication on a cell, the UE 102 and the eNB 160 may apply the same UL-DL configuration 194 on the same cell. However, different UL-DL configurations 194 may be applied on different cells (e.g., PCell and SCell(s)).

The UL-DL configurations 194 may also indicate PDSCH HARQ-ACK associations. A PDSCH HARQ-ACK association may specify a particular (PDSCH HARQ-ACK) timing for receiving HARQ-ACK information corresponding to a PDSCH. A PDSCH HARQ-ACK association may specify a reporting subframe in which the UE 102 reports (e.g., transmits) the HARQ-ACK information corresponding to the PDSCH to the eNB 160. The reporting subframe may be determined based on the subframe that includes the PDSCH sent by the eNB 160.

The eNB UL-DL configuration determination module 196 may determine which of the UL-DL configuration(s) 194 for the UE 102 to apply for one or more cells. For example, the eNB 160 may send one or more SIB1 indicating UL-DL configuration(s) 194 for a PCell and for one or more SCells. For instance, a PCell and an SCell may be utilized in carrier aggregation. The eNB UL-DL configuration determination module 196 may assign UL-DL configuration(s) 194 to the PCell and to the SCell. The eNB 160 may signal one or more of these assignments to a UE 102. The UL-DL configurations 194 for the PCell and SCell(s) may be the same or different.

The eNB reporting subframe determination module 198 may determine a reporting subframe for receiving HARQ-ACK information. For example, the eNB reporting subframe determination module 198 may determine a HARQ-ACK reporting subframe in which the eNB 160 receives SCell PDSCH HARQ-ACK information (e.g., PDSCH HARQ-ACK information corresponding to an SCell) from a UE 102.

The HARQ-ACK reporting subframe determination may be based on whether a conflicting subframe occurs between an UL-DL configuration 194 corresponding to a PCell (e.g., PCell configuration) and an UL-DL configuration 194 corresponding to an SCell (e.g., SCell configuration). For example, the eNB reporting subframe determination module 198 may determine whether a PCell configuration specifies UL and an SCell configuration specifies DL for a subframe or whether the PCell configuration specifies DL and the SCell configuration specifies DL for the subframe.

If the PCell and SCell both specify DL for a subframe (that includes an SCell PDSCH, for example), then the eNB reporting subframe determination module 198 may determine a HARQ-ACK reporting subframe based on the PCell configuration (for receiving SCell PDSCH HARQ-ACK information, for example). If the PCell specifies UL and the SCell specifies DL for a subframe (that includes an SCell PDSCH, for example), then the eNB reporting subframe determination module 198 may determine a HARQ-ACK reporting subframe based on a selected UL-DL configuration 194 and a subframe number corresponding to the subframe including the PDSCH, for example. The eNB 160 may receive the SCell HARQ-ACK information from the UE 102 in the determined HARQ-ACK reporting subframe.

The eNB operations module 182 may provide information 190 to the one or more receivers 178. For example, the eNB operations module 182 may inform the receiver(s) 178 when or when not to receive transmissions based on a UL-DL configuration 194 for a given cell.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or control information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on an UL-DL configuration 194. The one or more transmitters 117 may upconvert and transmit the modulated signal(s) 115 to one or more UEs 102.

It should be noted that a DL subframe may be transmitted from the eNB 160 to one or more UEs 102 and that an UL subframe may be transmitted from one or more UEs 102 to the eNB 160. Furthermore, both the eNB 160 and the one or more UEs 102 may transmit data in a standard special subframe.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
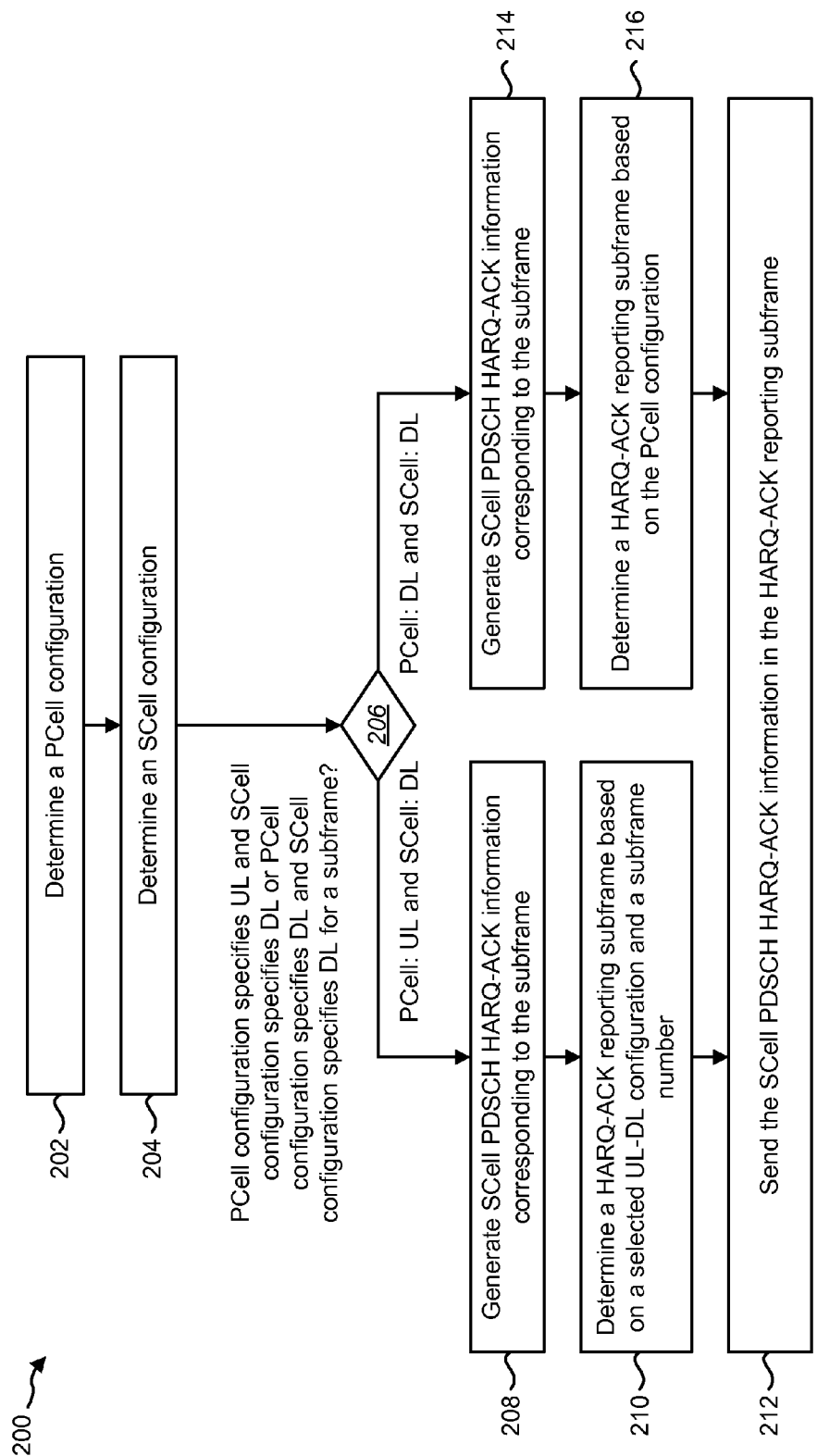
FIG. 2 is a flow diagram illustrating one configuration of a method for sending HARQ information for carrier aggregation.

FIG. 2 is a flow diagram illustrating one configuration of a method 200 for sending HARQ information for carrier aggregation. A UE 102 may determine 202 a PCell configuration. For example, the UE 102 may receive a SIB1 and determine an UL-DL configuration corresponding to (e.g., assigned to, to be applied to) a PCell based on the SIB1.

The UE 102 may determine 204 an SCell configuration. For example, the UE 102 may receive a SIB1 and determine an UL-DL configuration corresponding to (e.g., assigned to, to be applied to) an SCell based on the SIB1.

The UE 102 may determine 206 whether the PCell configuration specifies UL and the SCell configuration specifies DL for a subframe or whether the PCell configuration specifies DL and the SCell configuration specifies DL for the subframe. For a particular subframe, for example, the UE 102 may determine whether the PCell configuration and SCell configuration both specify DL for the subframe or whether the PCell configuration specifies UL while the SCell configuration specifies DL for the subframe.

If the PCell configuration specifies DL for the subframe and the SCell configuration specifies DL for the subframe, then the UE 102 may generate 214 SCell PDSCH HARQ-ACK information corresponding to the subframe. For example, the UE 102 may generate 214 HARQ-ACK information (e.g., ACK/NACK) based on whether data corresponding to a PDSCH in the subframe was correctly received or not.

The UE 102 may determine 216 a HARQ-ACK reporting subframe based on the PCell configuration. For example, if both the PCell configuration and the SCell configuration specify DL for the subframe, then the UE 102 may follow a PDSCH HARQ-ACK association (e.g., PDSCH HARQ-ACK timing) specified by the PCell configuration. The PDSCH HARQ-ACK association may indicate the HARQ-ACK reporting subframe. More detail is given below.

If the PCell configuration specifies UL for the subframe and the SCell configuration specifies DL for the subframe, then the UE 102 may generate 208 SCell PDSCH HARQ-ACK information corresponding to the subframe. For example, the UE 102 may generate 208 HARQ-ACK information (e.g., ACK/NACK) based on whether data corresponding to a PDSCH in the subframe was correctly received or not.

The UE 102 may determine 210 a HARQ-ACK reporting subframe based on a selected UL-DL configuration and a subframe number. For example, if the PCell configuration specifies UL and the SCell configuration specifies DL for the subframe, then the UE 102 may follow a selected PDSCH HARQ-ACK association (e.g., PDSCH HARQ-ACK timing) specified by a selected UL-DL configuration (based on a subframe number, for example). For instance, a selected UL-DL configuration may be a UL-DL configuration that is selected from Table (1). The selected PDSCH HARQ-ACK association may be an association that is selected from Table (2). The PDSCH HARQ-ACK association may indicate the HARQ-ACK reporting subframe. The selected UL-DL configuration may be predetermined or selected dynamically. More detail is given below.

The UE 102 may send 212 the SCell PDSCH HARQ-ACK information in the HARQ-ACK reporting subframe. For example, the UE 102 may send 212 the SCell PDSCH HARQ-ACK information on the determined 210, 216 HARQ-ACK reporting subframe (on the PCell, for instance). This may occur whether the PCell configuration and the SCell configuration both specify DL or whether the PCell configuration specifies UL and the SCell configuration specifies DL for the subframe. It should be noted that the SCell(s) and the PCell may be aggregated carriers (for concurrent utilization).

Figure 3:
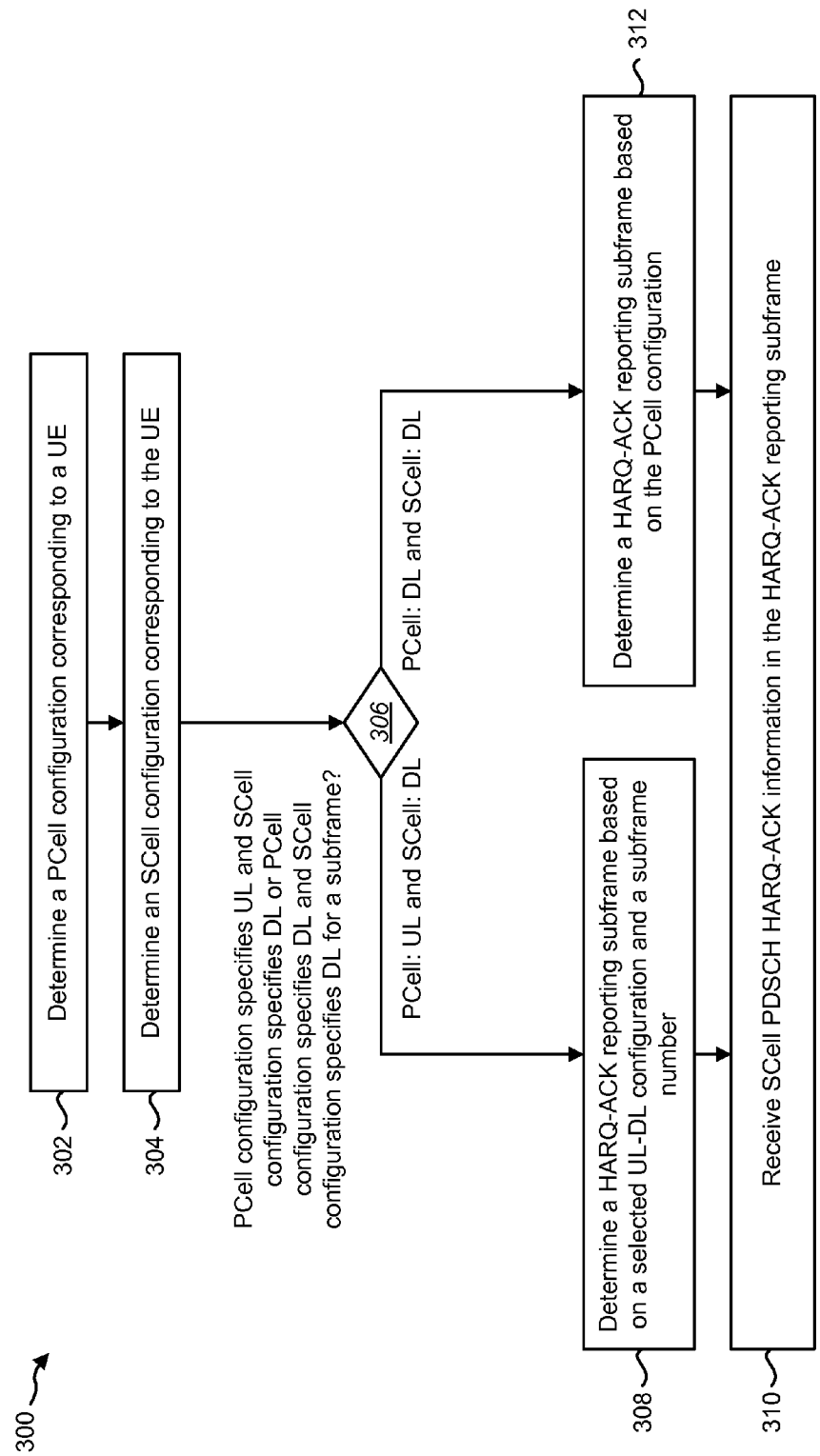
FIG. 3 is a flow diagram illustrating one configuration of a method for receiving HARQ information for carrier aggregation.

FIG. 3 is a flow diagram illustrating one configuration of a method 300 for receiving HARQ information for carrier aggregation. An eNB 160 may determine 302 a PCell configuration corresponding to a UE 102. For example, the eNB 160 may determine 302 an UL-DL configuration to be applied to a PCell. In some cases, this determination 302 may be based on network traffic (e.g., a proportion of UL to DL traffic), predetermined settings, etc. The eNB 160 may send a SIB1 to the UE 102 that indicates the PCell configuration. Additionally or alternatively, the eNB 160 may coordinate with another eNB 160 to determine 304 a PCell configuration and/or indicate the PCell configuration to the UE 102.

The eNB 160 may determine 304 an SCell configuration corresponding to the UE. For example, the eNB 160 may determine an UL-DL configuration to be applied to the SCell. In some cases, this determination 304 may be based on network traffic (e.g., a proportion of UL to DL traffic), predetermined settings, etc. The eNB 160 may send a SIB1 to the UE 102 that indicates the SCell configuration. Additionally or alternatively, the eNB 160 may coordinate with another eNB 160 to determine 304 an SCell configuration and/or indicate the SCell configuration to the UE 102.

The eNB 160 may determine 306 whether the PCell configuration specifies UL and the SCell configuration specifies DL for a subframe or whether the PCell configuration specifies DL and the SCell configuration specifies DL for the subframe. For a particular subframe, for example, the eNB 160 may determine 306 whether the PCell configuration and SCell configuration both specify DL for the subframe or whether the PCell configuration specifies UL while the SCell configuration specifies DL for the subframe.

If the PCell configuration specifies DL for the subframe and the SCell configuration specifies DL for the subframe, then the eNB 160 may determine 312 a HARQ-ACK reporting subframe based on the PCell configuration. For example, if both the PCell configuration and the SCell configuration specify DL for the subframe, then the eNB 160 may follow a PDSCH HARQ-ACK association (e.g., PDSCH HARQ-ACK timing) specified by the PCell configuration. The PDSCH HARQ-ACK association may indicate the HARQ-ACK reporting subframe. For example, the eNB 160 may anticipate receiving HARQ-ACK information in the HARQ-ACK reporting subframe. More detail is given below.

If the PCell configuration specifies UL for the subframe and the SCell configuration specifies DL for the subframe, then the eNB 160 may determine 308 a HARQ-ACK reporting subframe based on a selected UL-DL configuration and a subframe number. For example, if the PCell configuration specifies UL and the SCell configuration specifies DL for the subframe, then the eNB 160 may follow a selected PDSCH HARQ-ACK association (e.g., PDSCH HARQ-ACK timing) specified by a selected UL-DL configuration (based on a subframe number, for example). For instance, a selected UL-DL configuration may be a UL-DL configuration that is selected from Table (1). The selected PDSCH HARQ-ACK association may be an association that is selected from Table (2). The PDSCH HARQ-ACK association may indicate the HARQ-ACK reporting subframe. The selected UL-DL configuration may be predetermined or selected dynamically. More detail is given below.

The eNB 160 may receive 310 the SCell PDSCH HARQ-ACK information in the HARQ-ACK reporting subframe. For example, the eNB 160 may receive 310 the SCell PDSCH HARQ-ACK information on the determined 308, 312 HARQ-ACK reporting subframe (on the PCell, for instance). This may occur whether the PCell configuration and the SCell configuration both specify DL or whether the PCell configuration specifies UL and the SCell configuration specifies DL for the subframe. It should be noted that the SCell(s) and the PCell may be aggregated carriers (for concurrent utilization).

Figure 4:
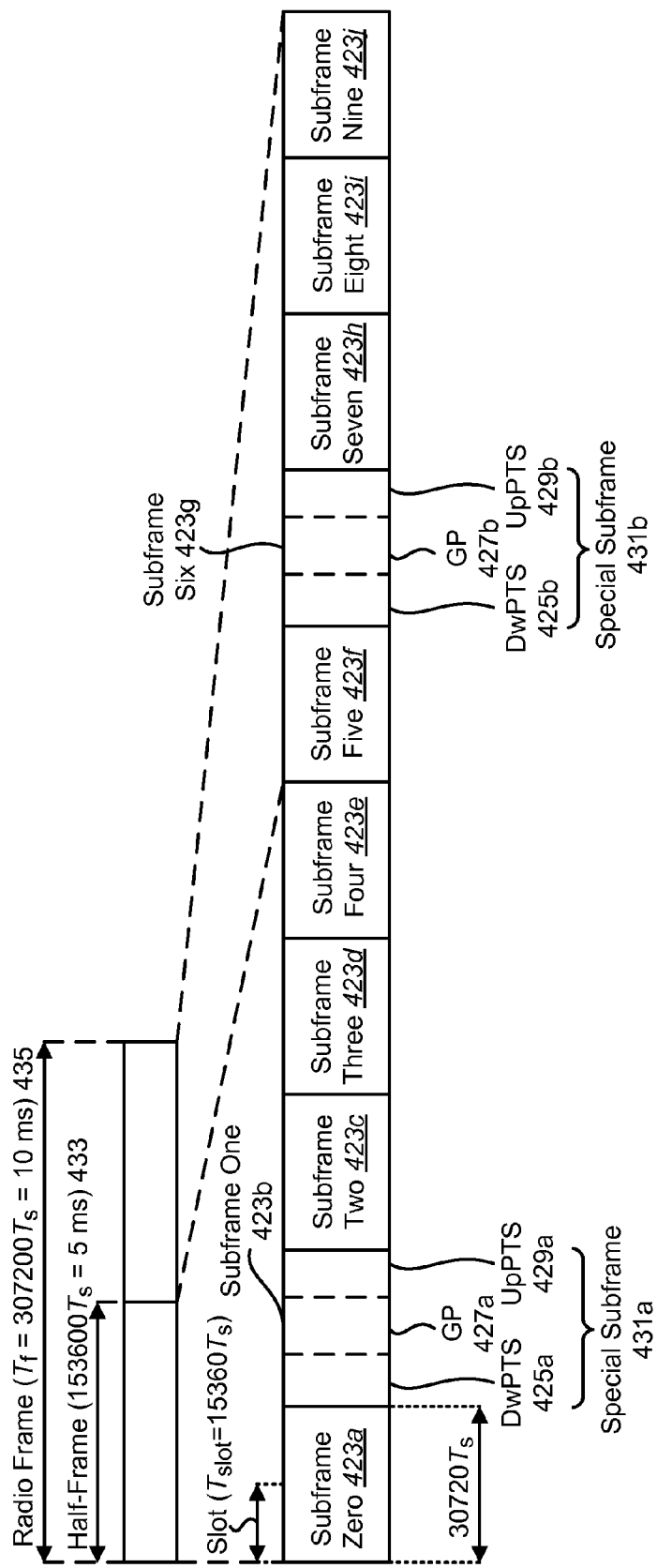
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure may be applicable in TDD approaches. Each radio frame 435 may have a length of $T_f = 307200 \cdot T_s = 10$ ms, where $T_f$ is a radio frame 435 duration and $T_s$ is a time unit equal to $$\frac{1}{(15000 \times 2048)}$$

seconds. The radio frame 435 may include two half-frames 433, each having a length of $153600 \cdot T_s = 5$ ms. Each half-frame 433 may include five subframes 423a-e, 423f-j each having a length of $30720 \cdot T_s = 1$ ms.

In Table (1) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (9) (from Table 4.2-1 of 3GPP TS 36.211) subject to the total length of DwPTS, GP and UpPTS being equal to $30720 \cdot T_s = 1$ ms. Table (9) illustrates several configurations of (standard) special subframes. Each subframe i is defined as two slots, 2i and 2i+1 of length $T_{slot} = 15360 \cdot T_s = 0.5$ ms in each subframe. In Table (9), "cyclic prefix" is abbreviated as "CP" and "configuration" is abbreviated as "Config" for convenience.

TABLE (9)

| Special Subframe Config | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |

TABLE (9)-continued

| | | Normal CP in downlink | | | Extended CP in downlink | |
| | | UpPTS | | | UpPTS | |
| Special Subframe Config | DwPTS | Normal CP in uplink | Extended CP in uplink | DwPTS | Normal CP in uplink | Extended CP in uplink |
|---|---|---|---|---|---|---|
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL-DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 423 that may be used include a downlink subframe, an uplink subframe and a special subframe 431. In the example illustrated in FIG. 4, which has a 5 ms periodicity, two standard special subframes 431a-b are included in the radio frame 435.

The first special subframe 431a includes a downlink pilot time slot (DwPTS) 425a, a guard period (GP) 427a and an uplink pilot time slot (UpPTS) 429a. In this example, the first standard special subframe 431a is included in subframe one 423b. The second standard special subframe 431b includes a downlink pilot time slot (DwPTS) 425b, a guard period (GP) 427b and an uplink pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table (9) above) subject to the total length of each set of DwPTS 425, GP 427 and UpPTS 429 being equal to $30720 \cdot T_s = 1$ ms.

Each subframe i 423a-j (where i denotes a subframe ranging from subframe zero 423a (e.g., 0) to subframe nine 423j (e.g., 9) in this example) is defined as two slots, 2i and 2i+1 of length $T_{slot} = 15360 \cdot T_s = 0.5$ ms in each subframe 423. For example, subframe zero (e.g., 0) 423a may include two slots, including a first slot.

UL-DL configurations with both 5 ms and 10 ms downlink-to-uplink switch-point periodicity may be used in accordance with the systems and methods disclosed herein. FIG. 4 illustrates one example of a radio frame 435 with 5 ms switch-point periodicity. In the case of 5 ms downlink-to-uplink switch-point periodicity, each half-frame 433 includes a standard special subframe 431a-b. In the case of 10 ms downlink-to-uplink switch-point periodicity, a special subframe may exist in the first half-frame 433 only.

Subframe zero (e.g., 0) 423a and subframe five (e.g., 5) 423f and DwPTS 425a-b may be reserved for downlink transmission. The UpPTS 429a-b and the subframe(s) immediately following the special subframe(s) 431a-b (e.g., subframe two 423c and subframe seven 423h) may be reserved for uplink transmission.

Figure 5:
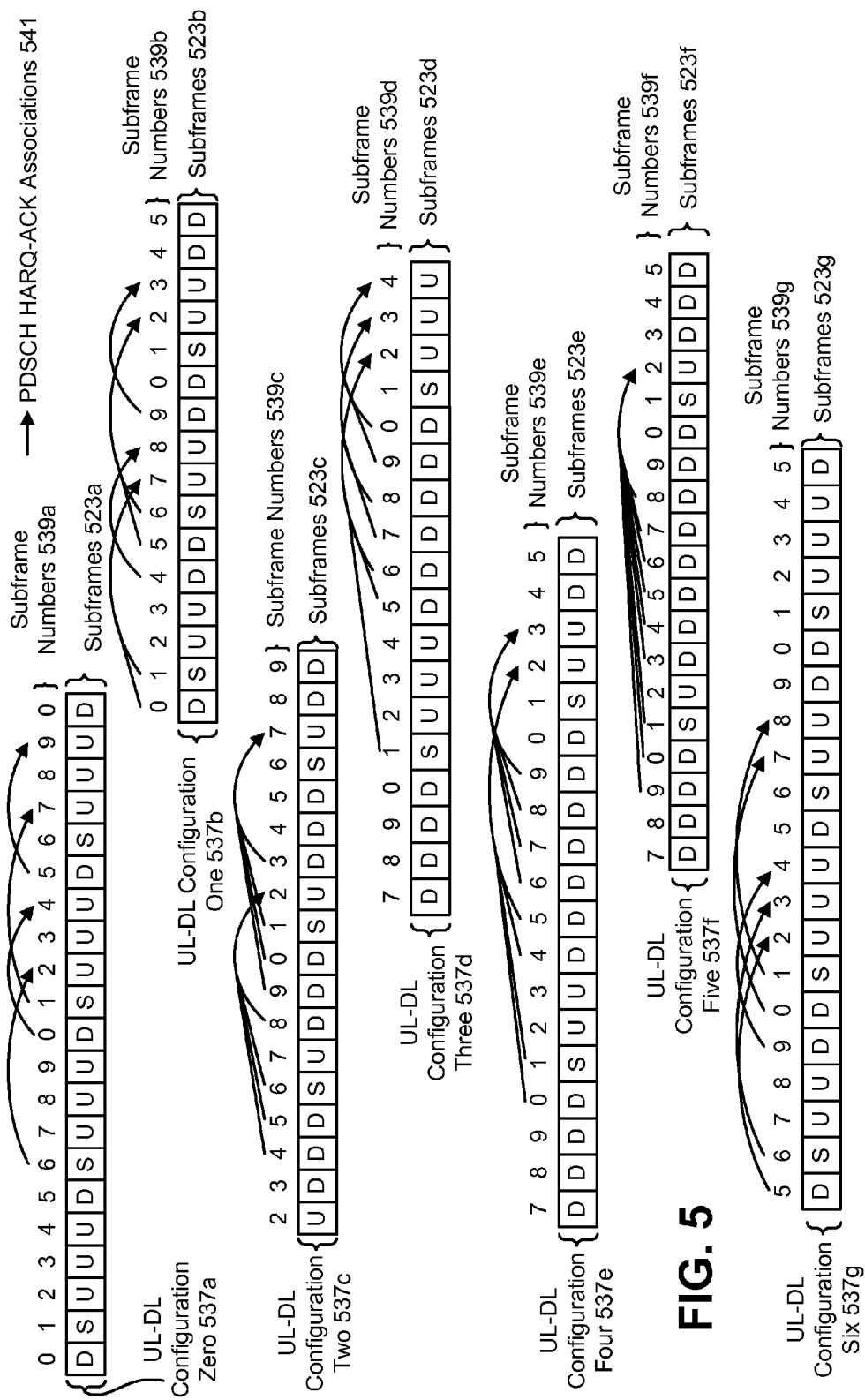
FIG. 5 is a diagram illustrating some uplink-downlink (UL-DL) configurations in accordance with the systems and methods described herein.

FIG. 5 is a diagram illustrating some UL-DL configurations 537a-g in accordance with the systems and methods described herein. In particular, FIG. 5 illustrates UL-DL configuration zero 537a (e.g., "UL-DL configuration 0") with subframes 523a and subframe numbers 539a, UL-DL configuration one 537b (e.g., "UL-DL configuration 1") with subframes 523b and subframe numbers 539b, UL-DL configuration two 537c (e.g., "UL-DL configuration 2") with subframes 523c and subframe numbers 539c and UL-DL configuration three 537d (e.g., "UL-DL configuration 3") with subframes 523d and subframe numbers 539d. FIG. 5 also illustrates UL-DL configuration four 537e (e.g., "UL-DL configuration 4") with subframes 523e and subframe numbers 539e, UL-DL configuration five 537f (e.g., "UL-DL configuration 5") with subframes 523f and subframe numbers 539f and UL-DL configuration six 537g (e.g., "UL-DL configuration 6") with subframes 523g and subframe numbers 539g.

FIG. 5 further illustrates PDSCH HARQ-ACK associations 541 (e.g., PDSCH HARQ-ACK feedback on PUCCH or PUSCH associations). The PDSCH HARQ-ACK associations 541 may indicate HARQ-ACK reporting subframes corresponding to subframes for PDSCH transmissions (e.g., subframes in which PDSCH transmissions may be sent and/or received). It should be noted that some of the radio frames illustrated in FIG. 5 have been truncated for convenience.

The systems and methods disclosed herein may be applied to one or more of the UL-DL configurations 537a-g illustrated in FIG. 5. For example, one or more PDSCH HARQ-ACK associations 541 corresponding to one of the UL-DL configurations 537a-g illustrated in FIG. 5 may be applied to communications between a UE 102 and eNB 160. For example, an UL-DL configuration 537 may be determined (e.g., assigned to, applied to) a PCell. In this case, PDSCH HARQ-ACK associations 541 may specify PDSCH HARQ-ACK timing (e.g., a HARQ-ACK reporting subframe) for HARQ-ACK feedback transmissions corresponding to the PCell. For SCell HARQ-ACK feedback transmissions, the PDSCH HARQ-ACK associations 541 corresponding to the PCell may be applied for SCell HARQ-ACK feedback transmissions if the PCell configuration and the SCell configuration both specify DL for the subframe including an SCell PDSCH. For SCell HARQ-ACK feedback transmissions, the PDSCH HARQ-ACK associations 541 corresponding to a selected UL-DL configuration 537 may be applied for SCell HARQ-ACK feedback transmissions if the PCell configuration specifies UL and the SCell configuration specifies DL for the subframe including an SCell PDSCH.

Figure 6:
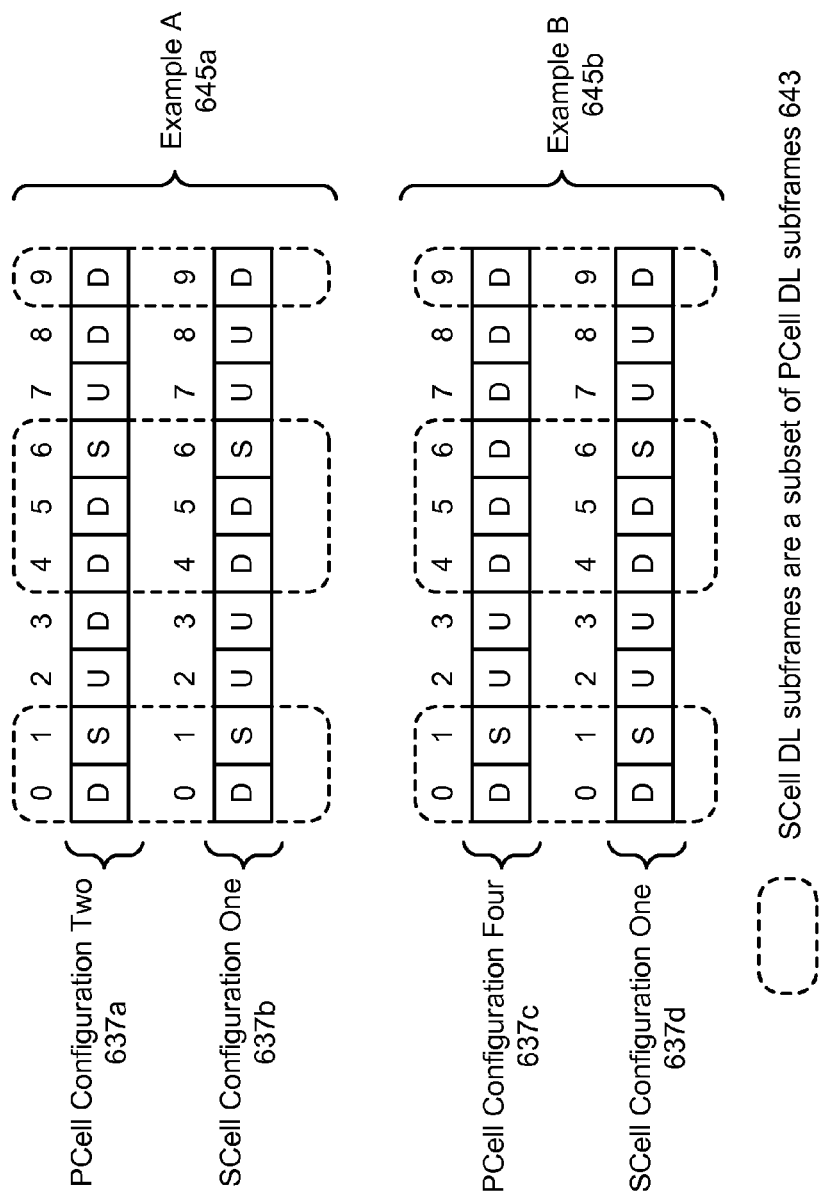
FIG. 6 is a diagram illustrating examples of primary cell (PCell) and secondary cell (SCell) configurations.

FIG. 6 is a diagram illustrating examples of PCell and SCell configurations. More specifically, examples 645a-b where DL subframes indicated by an SCell configuration are a subset of DL subframes indicated by a PCell configuration are illustrated. In accordance with the systems and methods disclosed herein, the SCell PDSCH HARQ-ACK timing (e.g., reports) may follow the PCell configuration if the set of DL subframes indicated by the SCell configuration (as determined based on a SIB1, for example) is a subset of the DL subframes indicated by the PCell configuration (as determined based on a SIB1, for example). In this case, all DL subframes in the SCell configuration are also DL subframes in the PCell configuration. It should be noted that the PCell may have extra DL subframes allocated beyond those of the SCell. In FIG. 6, DL subframes are denoted with a "D," UL subframes are denoted with a "U," and special subframes (which may include both an UL component and a DL component, for example) are denoted as an "S" for convenience.

In particular, FIG. 6 illustrates example A 645a and example B 645b, where the set of DL subframes indicated by the SCell configuration is a subset of the DL subframes indicated by the PCell configuration. More specifically, example A 645a illustrates PCell configuration two (e.g., "2") 637a and SCell configuration one (e.g., "1") 637b. In example A 645a, SCell DL subframes 0, 1, 4, 5, 6 and 9 are a subset of PCell DL subframes 643. Example B 645b illustrates PCell configuration four (e.g., "4") 637c and SCell configuration one (e.g., "1") 637d. In example B 645b, SCell DL subframes 0, 1, 4, 5, 6 and 9 are a subset of PCell DL subframes 643. In example A 645a and example B 645b, SCell HARQ-ACK reporting may follow the HARQ-ACK timing of the respective PCell configuration 637a, 637c.

Figure 7:
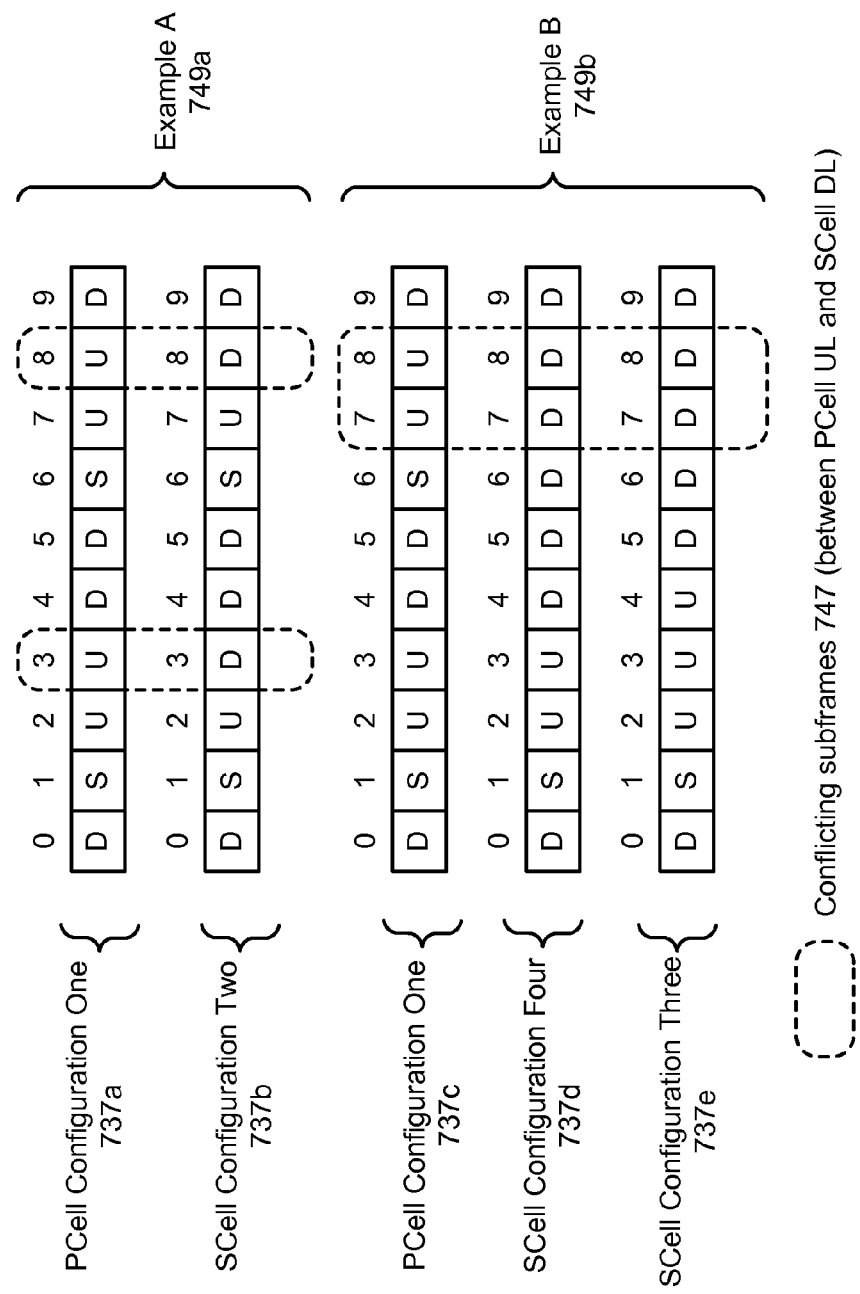
FIG. 7 is a diagram illustrating additional examples of PCell and SCell configurations.

FIG. 7 is a diagram illustrating additional examples of PCell and SCell configurations. More specifically, examples 749a-b where DL subframes indicated by an SCell configuration are not a subset of DL subframes indicated by a PCell configuration are illustrated. If the set of DL subframes indicated by the SCell configuration (as determined based on a SIB1, for example) is not a subset of the DL subframes indicated by the PCell configuration (as determined based on a SIB1, for example), then there is at least one conflicting subframe 747. For example, a conflicting subframe 747 may be where a PCell configuration indicates UL and an SCell configuration indicates DL for a subframe. In FIG. 7, DL subframes are denoted with a "D," UL subframes are denoted with a "U," and special subframes (which may include both an UL component and a DL component, for example) are denoted as an "S" for convenience.

In some approaches, and in a case that the set of DL subframes indicated by the SCell configuration is not a subset of the DL subframes indicated by the PCell configuration, the HARQ-ACK bits of the SCell may be mapped to UL subframe allocations in a PCell, while the SCell may follow PCell timing in a subframe where both the PCell and the SCell have DL subframe allocations. In this approach, new association timing may be added to the existing HARQ-ACK table for some cases where the set of DL subframes indicated by the SCell configuration is not a subset of the DL subframes indicated by the PCell configuration.

In accordance with the systems and methods disclosed herein, however, no new HARQ-ACK timing may be introduced for inter-band TDD carrier aggregation. As used herein, "no new HARQ-ACK timing" means that no new HARQ-ACK timing table entries may be defined for the systems and methods disclosed herein beyond those already defined in 3GPP Releases 8, 9 and 10. For a PDSCH, the HARQ-ACK timing table refers to the table of the downlink association set index for TDD illustrated in Table (2) above (from 3GPP TS 36.213).

In particular, FIG. 7 illustrates example A 749a and example B 749b, where the set of DL subframes indicated by the SCell configuration is not a subset of the DL subframes indicated by the PCell configuration. More specifically, example A 749a illustrates PCell configuration one (e.g., "1") 737a and SCell configuration two (e.g., "2") 737b. In example A 749a, subframes 3 and 8 are conflicting subframes 747 between the PCell configuration that indicates UL and the SCell configuration that indicates DL for the subframes. Example B 749b illustrates PCell configuration one (e.g., "1") 737c, SCell configuration four (e.g., "4") 737d and SCell configuration three (e.g., "3") 737e. In example B 749b, subframes 7 and 8 are conflicting subframes 747 between SCell configuration four 737d and PCell configuration one 737c as well as between SCell configuration three 737e and PCell configuration one 737c.

In example A 749a and example B 749b, SCell HARQ-ACK reporting may follow the HARQ-ACK timing of a selected UL-DL configuration. For example, a UE 102 and an eNB 160 may determine a HARQ-ACK reporting subframe based on a selected UL-DL configuration and a subframe number in example A 749a and example B 749b.

Figure 8:
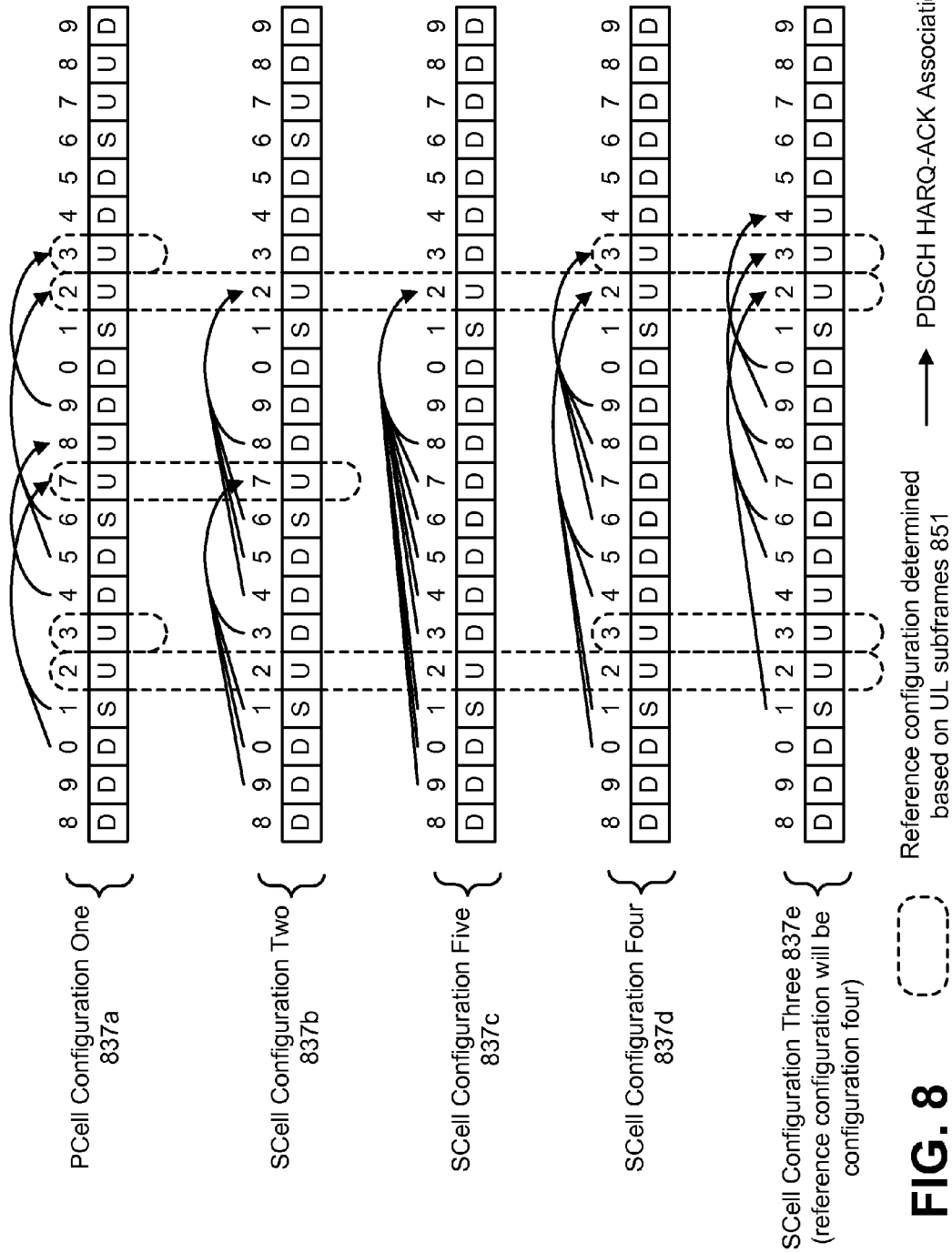
FIG. 8 is a diagram illustrating a first procedure for reporting Physical Downlink Shared Channel (PDSCH) HARQ Acknowledgement (HARQ-ACK)

FIG. 8 is a diagram illustrating a first procedure for reporting PDSCH HARQ-ACK. In particular, FIG. 8 illustrates examples of PCell and SCell configurations that may be utilized to determine a reference configuration. For example, several procedures may be utilized for reporting PDSCH HARQ-ACK if the set of DL subframes indicated by the SCell configuration is not a subset of the DL subframes indicated by the PCell configuration. In a first procedure, all subframes in an SCell follow a reference configuration. In this first procedure, PDSCHs of DL subframes in an SCell follow a reference UL-DL configuration timing. The reference configuration may be derived by selecting a subset of overlapping UL subframes. Thus, if the set of UL subframes of an SCell is a subset of the set of UL subframes of the PCell, the reference configuration may be the SCell configuration. However, if the set of UL subframes of an SCell is not a subset of the set of UL subframes of the PCell, the reference configuration may be another TDD UL-DL configuration that has less ULs than both the PCell and the SCell. In case of multiple SCells, each SCell may follow its own reference configuration. Thus, multiple different reference configurations may be used.

Additionally or alternatively, the reference configuration can be signaled by higher layer (e.g., Radio Resource Control (RRC) signaling). For a given PCell and SCell combination, multiple TDD UL-DL configurations may be used as the reference configuration for the SCell. The eNB may select one as the reference configuration by higher layer signaling. In a case of multiple SCells, each SCell may follow a separate reference configuration. Alternatively, one reference configuration may be applied for all SCells. However, this may require higher layer signaling. In some implementations, a single reference configuration may be derived by selecting a subset of overlapping UL subframes of the PCell configuration and configurations of all configured or activated SCell(s).

FIG. 8 provides some examples based on this first procedure. In particular, FIG. 8 illustrates PCell configuration one (e.g., "1") 837a, SCell configuration two (e.g., "2") 837b, SCell configuration five (e.g., "5") 837c, SCell configuration four (e.g., "4") 837d and SCell configuration three (e.g., "3") 837e. PDSCH HARQ-ACK associations 841 are illustrated, as well as subframes for which a reference UL-DL configuration may be determined based on UL subframes 851.

With TDD UL-DL configuration one (e.g., "1") applied in the PCell, the reference configurations of an SCell with different TDD configuration may be derived as shown in FIG. 8. For example, assuming that one or more SCells have only one different TDD configuration, if an SCell is configured with configuration two 837b, four 837d or five 837c, the reference configuration can be the same as the SCell configuration. However, if the SCell has configuration three 837e, the reference configuration will be configuration four by selecting only the overlapping UL subframes. Thus, with PCell configuration one 837a and SCell configuration four 837d, the reference configuration will be different from both the PCell configuration and the SCell configuration.

Furthermore, by higher layer signaling, an eNB may configure a different TDD UL-DL configuration as the reference configuration, provided that the set of UL subframes of the reference configuration is a subset of the overlapping UL subframes of the PCell and the SCell. Thus, if the SCell has configuration four 837d, besides configuration four 837d, an eNB may also signal a reference configuration with configuration two or configuration five.

One benefit of the first procedure is the possible reuse of existing TDD UL-DL configurations for an SCell with a different configuration. However, there may be several drawbacks associated with this first procedure. First, the PDSCH HARQ-ACK bits may not be balanced in different uplink reports on the PCell. The overlapping UL subframes may have a much higher payload due to the aggregation of HARQ-ACK bits from one or more SCells. In accordance with the examples illustrated in FIG. 8, with PCell configuration one 837a, if the SCell has UL-DL configuration two 837b, UL subframes 2 and 7 need to report HARQ-ACK bits from both cells, and UL subframes 3 and 8 only report HARQ-ACK bits corresponding to the PCell. Thus, the payload may be 6 bits in subframes 2 and 7, and 1 bit in subframes 3 and 8.

Similarly, if an SCell has configuration four 837d or three 837e, UL subframes 2 and 3 may report aggregated HARQ-ACK bits from both the PCell and the SCell with a HARQ-ACK payload of 6 and 5 bits, respectively, assuming only one SCell, and UL subframes 7 and 8 only report HARQ-ACK bits of the PCell with a HARQ-ACK payload of 2 bits and 1 bit, respectively. The HARQ-ACK unbalance situation is even worse if an SCell has configuration five. In that case, all SCell bits are aggregated and reported on UL subframe 2 of the PCell with a HARQ-ACK payload of 11 bits, even with only one SCell. The high payload in some UL subframes may lead to worse PUCCH and/or PUSCH performance on the PCell. The worse performance of PUCCH may also result in smaller cell coverage.

In this first approach, the PDSCH HARQ-ACK bits may be additionally reported in a crossover manner due to different TDD configuration timings utilized on the PCell and one or more SCells. For example, a PDSCH on an SCell may be transmitted earlier than a PDSCH on the PCell, but the corresponding HARQ-ACK of the PDSCH on the SCell may be reported later than the HARQ-ACK of PDSCH on the PCell. This may cause an unnecessary delay. For example in FIG. 8, if the PCell has configuration one 837a and the SCell has configuration four 837d, the HARQ-ACK feedback of a PDSCH transmission in subframe 4 on the PCell is reported in UL subframe 8 of the same radio frame on the PCell. However, the HARQ-ACK feedback of a PDSCH transmission in subframes 0 and 1 on the SCell are reported in UL subframe 2 of the next radio frame on the PCell following the reference UL-DL configuration setting.

Furthermore, the HARQ-ACK of PDSCHs of the PCell and the SCell in the same DL subframe may be reported in different UL subframes. This may causes some confusion and is not consistent with the cross-carrier scheduling. With cross-carrier scheduling, the PDCCH of the scheduling cell can be used to schedule a PDSCH or PUSCH transmission of another SCell. The HARQ-ACK feedback of the PDSCH or PUSCH should be associated with the scheduling cell timing. For example in FIG. 8, if the PCell has configuration one 837a and the SCell has configuration four 837d, the HARQ-ACK feedback of a PDSCH transmission in subframes 0 and 1 on the PCell are reported in UL subframe 7 of the same radio frame on the PCell, but the HARQ-ACK feedback of PDSCH transmission in subframes 0 and 1 on the SCell are reported in UL subframe 2 of the next radio frame on PCell following the reference UL-DL configuration setting.

Additionally, the first approach is more complex because different SCells may need different reference configurations, and the reference configuration may be different from both the PCell configuration and the SCell configuration. As an example in FIG. 8, if the PCell has UL-DL configuration one 837a and the SCell has UL-DL configuration three 837e, the reference configuration would be UL-DL configuration four.

Higher layer signaling may also cause delay and service interruption. For example, if an SCell is activated or deactivated, the UE may not know what association timing should be used before higher layer signaling is received. Furthermore, if there are multiple SCells with different TDD UL-DL configurations, multiple reference UL-DL configurations may be used. If one reference UL-DL configuration is signaled and is applied to all SCells, the PDSCH HARQ-ACK unbalance issue may worsen.

Figure 9:
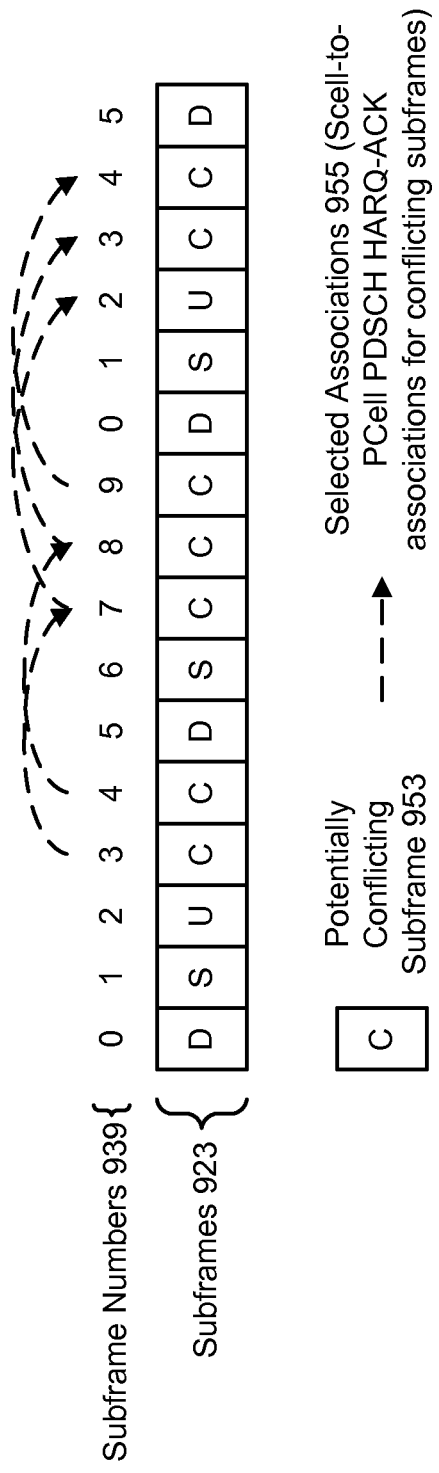
FIG. 9 is a diagram illustrating one example of selected associations for a PCell with 5 millisecond (ms) periodicity in accordance with the systems and methods described herein.

FIG. 9 is a diagram illustrating one example of selected associations for a PCell with 5 ms periodicity in accordance with the systems and methods described herein. In particular, FIG. 9 illustrates some subframes 923 with subframe numbers 939 along with an example of selected associations 955 for PDSCH HARQ-ACK reporting for conflicting subframes 953.

In a second procedure, SCell timing may be determined on a subframe basis. In this second procedure, the timing can be determined based on the type of subframe. In non-conflicting subframes where both PCell and SCell have DL subframe allocations, the SCell may follow the PCell timing. Thus, the HARQ-ACK of PDSCHs of the PCell and the SCell in the same DL subframe may be reported in the same UL subframe. This is consistent with cross-carrier scheduling such that the HARQ-ACK feedback of cross-carrier scheduled subframes are associated with the same timing as the scheduling cell. In a conflicting subframe, where the PCell configuration indicates UL and the SCell configuration indicates DL, the subframe on the SCell may be mapped to a PCell UL subframe.

The systems and methods disclosed herein provide a fourth approach in the second procedure for mapping the conflicting subframes with a PCell UL subframe allocation and an SCell DL subframe allocation. In this fourth approach, only the PCell configuration may be used as the reference configuration.

With a given PCell configuration, for each potentially conflicting subframe with a PCell UL subframe allocation and an SCell DL subframe allocation, an association mapping may be derived from all possible SCell configurations. For a given PCell configuration, the potentially conflicting subframes with a PCell UL subframe allocation and an SCell DL subframe allocation are all conflicting subframes between the given PCell configuration and the TDD UL-DL configuration five (e.g., the configuration with minimum UL subframe allocations).

Thus, for any SCell configuration, the set of conflicting subframes with a PCell UL subframe allocation and an SCell DL subframe allocation may be a subset of the potentially conflicting subframes with a PCell UL subframe allocation and an SCell DL subframe allocation. Moreover, the set of potentially conflicting subframes (e.g., possibly conflicting subframes) with a PCell UL subframe allocation and an SCell DL subframe allocation may be derived for each periodicity (e.g., 5 ms and 10 ms) of TDD UL-DL configurations.

In one example of a 5 ms periodicity case, the set of potentially conflicting subframes with a PCell UL subframe allocation and an SCell DL subframe allocation may be derived based on configuration zero on the PCell and configuration five on the SCell. In one example of a 10 ms periodicity case, the set of potentially conflicting subframes with a PCell UL subframe allocation and an SCell DL subframe allocation may be derived by configuration three on the PCell and configuration five on the SCell.

For each potentially conflicting subframe with a PCell UL subframe allocation and an SCell DL subframe allocation, the association mapping may be selected from the existing HARQ-ACK association table (e.g., Table (2) above). The selection may be based on (e.g., optimized based on) HARQ-ACK payload balancing and HARQ-ACK delay. The selected association mapping may be applied to all SCell configurations, if applicable. The associations of different potentially conflicting subframes may be selected from different TDD configurations. Since this association mapping is fixed to all SCell configurations, no reference configuration and no higher layer signaling may be needed.

Table (3) above lists potentially conflicting subframes with a PCell UL subframe allocation and an SCell DL subframe allocation for a TDD PCell with 5 ms periodicity. Table (3) also lists the existing associations and examples of selected associations. Table (4) lists the applicability of the conflicting subframe with different PCell configurations with 5 ms periodicity. Table (5) shows an example of a selected downlink association index for potentially conflicting subframes when a PCell configuration has a 5 ms periodicity.

FIG. 9 illustrates an example of selected associations (selected from the PDSCH HARQ-ACK association table (e.g., Table (2)), for example) for a PCell with 5 ms periodicity. In FIG. 9, "D" denotes a DL subframe, "U" denotes an UL subframe, "S" denotes a special subframe, and "C" denotes a potentially conflicting subframe 953.

Table (4) above illustrates the applicability of potentially conflicting subframes with a PCell UL subframe allocation and an SCell DL subframe allocation for a TDD PCell with 5 ms periodicity. Table (5) above illustrates one example of selected downlink association index for potentially conflicting subframes for a TDD PCell with 5 ms periodicity. Furthermore, FIG. 9 illustrates one example of selected associations 955 (selected from the PDSCH HARQ-ACK association table (e.g., Table (2)) for a PCell with 5 ms periodicity. In particular, FIG. 9 illustrates SCell-to-PCell PDSCH HARQ-ACK associations for conflicting subframes that are selected from Table (2). This example of selected associations is also illustrated in Table (3) and Table (5) above.

Figure 10:
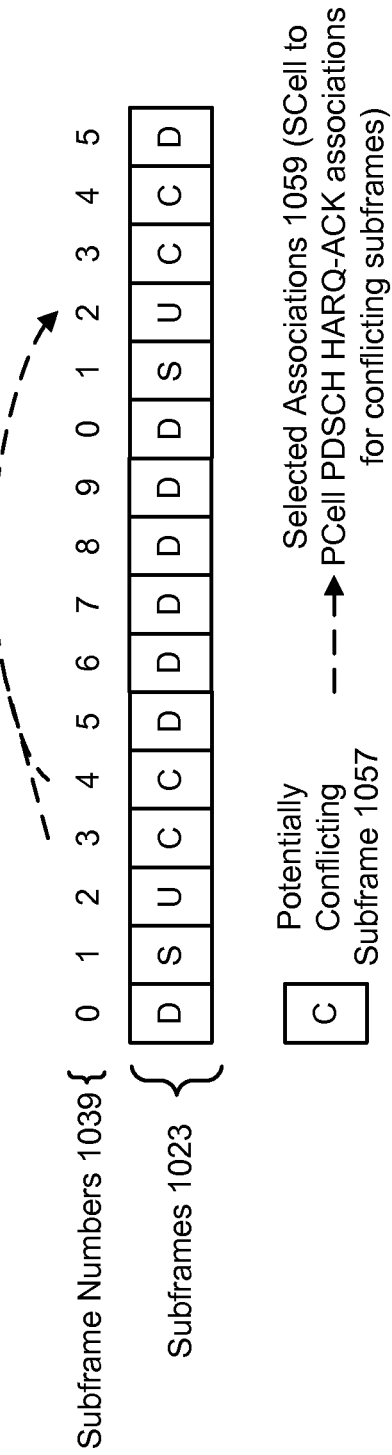
FIG. 10 is a diagram illustrating one example of selected associations for a PCell with 10 ms periodicity in accordance with the systems and methods disclosed herein.

FIG. 10 is a diagram illustrating one example of selected associations for a PCell with 10 ms periodicity in accordance with the systems and methods disclosed herein. In particular, FIG. 10 illustrates some subframes 1023 with subframe numbers 1039 along with an example of selected associations 1059 for PDSCH HARQ-ACK reporting for conflicting subframes 1057. Selected associations may be selected from an existing PDSCH HARQ-ACK association table (e.g., Table (2)) for a PCell with 10 ms periodicity.

When the PCell configuration has a periodicity of 10 ms, only subframe 3 and subframe 4 may be potentially conflicting subframes 1057 with a PCell UL subframe allocation and an SCell DL subframe allocation as listed in Table (8) and FIG. 10. Table (7) above lists the applicability of the potentially conflicting subframes for PCell configurations with 10 ms periodicity. Table (8) illustrates one example of a selected downlink association index for potentially conflicting subframes when a PCell has 10 ms periodicity. In some implementations, to better balance the HARQ-ACK payload, an exception case may be defined if UL-DL configuration three is configured on the PCell. Instead of mapping to the UL subframe 2 of the next radio frame, the PDSCH transmissions in potentially conflicting subframe 3 and subframe 4 may be associated with the UL subframe 3 and subframe 4 of the next radio frame on the PCell.

In some implementations of the systems and methods disclosed herein, one or more of the following rules may be applied for a PCell configuration, for any SCell TDD configuration and for combinations of configurations. An SCell may follow the PCell timing in non-conflicting subframes (e.g., subframes where both the PCell and the SCell have DL subframe allocations). In a conflicting subframe where the PCell has DL subframe allocation and an SCell has UL subframe allocation, no PDSCH HARQ-ACK is needed for the SCell. Thus, PDSCH HARQ-ACK on the PCell follows its own timing.

In a conflicting subframe with a PCell UL subframe allocation and an SCell DL subframe allocation, a selected PDSCH HARQ-ACK association may be applied if applicable (as listed in Table (4) and Table (7), for example). Since the same association is used for a given subframe and for all SCell configurations, there may be no need to signal an extra reference configuration. The association mapping is independent of the SCell configuration and combinations of TDD UL-DL configurations.

The selected associations in the above tables and in FIG. 9 and FIG. 10 illustrate examples of selecting PDSCH HARQ-ACK associations from existing table entries. Other associations may also be selected instead of the example selected associations above. In one case, for example, the selected associations from the existing PDSCH HARQ-ACK table (e.g., Table (2)) may be applied to all SCell configurations and combinations of configurations. In another case, for example, the selected associations for an SCell configuration may depend on the combination of PCell and SCell configurations. Thus, the selected associations of one PCell and SCell combination may be different from another PCell and SCell combination. However, as long as the selected associations are specified for each combination and are used whenever applicable, there is no need for extra higher layer signaling, such as RRC signaling.

Table (6) above illustrates potentially conflicting subframes with a PCell UL subframe allocation and an SCell DL subframe allocation for TDD PCell with 10 ms periodicity. Table (7) above illustrates the applicability of potentially conflicting subframes with a PCell UL subframe allocation and an SCell DL subframe allocation for TDD PCell with 10 ms periodicity. Table (8) above illustrates a selected downlink association index for potentially conflicting subframes for a TDD PCell with 10 ms periodicity.

Figure 11:
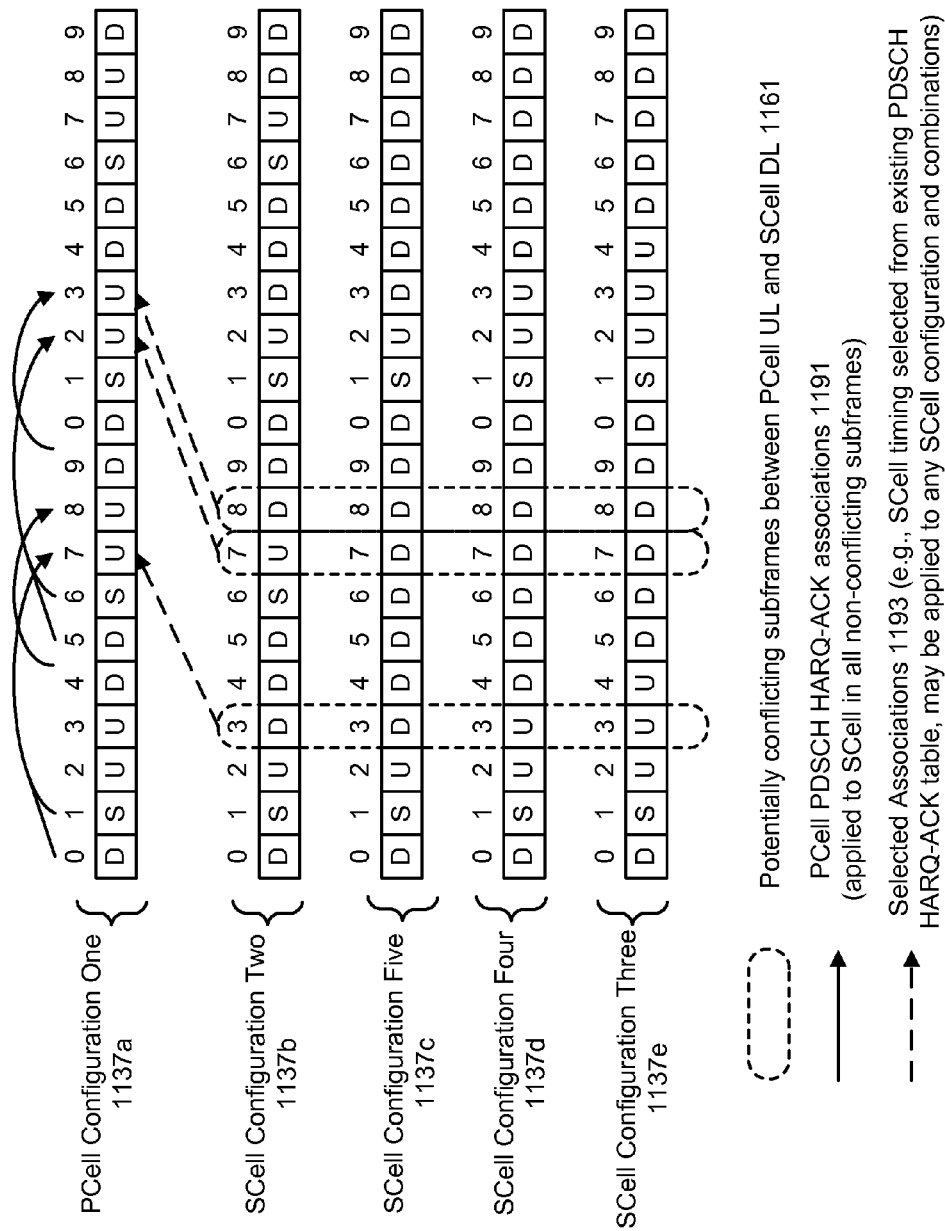
FIG. 11 is a diagram illustrating examples of determining a HARQ-ACK reporting subframe in accordance with the systems and methods disclosed herein.

FIG. 11 is a diagram illustrating examples of determining a HARQ-ACK reporting subframe in accordance with the systems and methods disclosed herein. In particular, FIG. 11 illustrates an example similar to that illustrated in FIG. 8, but based on the systems and methods disclosed herein. More specifically, FIG. 11 illustrates PCell configuration one (e.g., "1") 1137*a*, SCell configuration two (e.g., "2") 1137*b*, SCell configuration five (e.g., "5") 1137*c*, SCell configuration four (e.g., "4") 1137*d* and SCell configuration three (e.g., "3") 1137*e*. PCell PDSCH HARQ-ACK associations 1191 (e.g., HARQ-ACK timing) and an example of selected associations 1193 are also illustrated.

In this example, the PCell has UL-DL configuration one. In this case, there are three potentially conflicting subframes 1161: subframe 3, subframe 7 and subframe 8. For any SCell configuration, in a non-conflicting subframe where both PCell and SCell have DL subframe allocations, the PCell timing may be followed. In a conflicting subframe with PCell DL subframe allocation and SCell UL subframe allocation, the PCell keeps its own PDSCH HARQ-ACK timing, and no PDSCH HARQ-ACK is needed for the SCell. In a conflicting subframe 1161 with a PCell UL subframe allocation and an SCell DL subframe allocation, the selected association 1193 mapping from the existing HARQ-ACK association table may be applied. This is also illustrated in FIG. 9 and in Table (5). The resulting mapping is relatively clean and simple, compared with the procedure described in connection with FIG. 8. Thus, FIG. 11 illustrates examples of PDSCH HARQ-ACK mapping with selected associations 1193 from the existing table.

Figure 12:
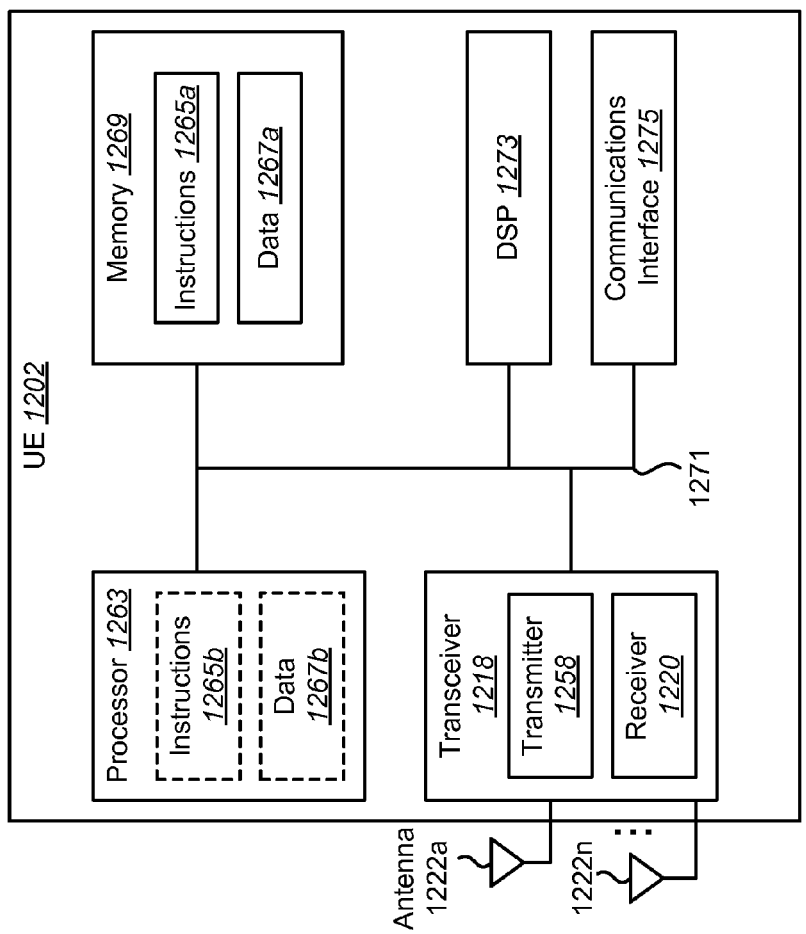
FIG. 12 illustrates various components that may be utilized in a UE.

FIG. 12 illustrates various components that may be utilized in a UE 1202. The UE 1202 described in connection with FIG. 12 may be implemented in accordance with the UE 102 described in connection with FIG. 1. The UE 1202 includes a processor 1263 that controls operation of the UE 1202. The processor 1263 may also be referred to as a central processing unit (CPU). Memory 1269, which may include read-only memory (ROM), random access memory (RAM), a combination of the two or any type of device that may store information, provides instructions 1265*a* and data 1267*a* to the processor 1263. A portion of the memory 1269 may also include non-volatile random access memory (NVRAM). Instructions 1265*b* and data 1267*b* may also reside in the processor 1263. Instructions 1265*b* and/or data 1267*b* loaded into the processor 1263 may also include instructions 1265*a* and/or data 1267*a* from memory 1269 that were loaded for execution or processing by the processor 1263. The instructions 1265*b* may be executed by the processor 1263 to implement the method 200 described above.

The UE 1202 may also include a housing that contains one or more transmitters 1258 and one or more receivers 1220 to allow transmission and reception of data. The transmitter(s) 1258 and receiver(s) 1220 may be combined into one or more transceivers 1218. One or more antennas 1222*a-n* are attached to the housing and electrically coupled to the transceiver 1218.

The various components of the UE 1202 are coupled together by a bus system 1271, which may include a power bus, a control signal bus and a status signal bus, in addition to a data bus. However, for the sake of clarity, the various buses are illustrated in FIG. 12 as the bus system 1271. The UE 1202 may also include a digital signal processor (DSP) 1273 for use in processing signals. The UE 1202 may also include a communications interface 1275 that provides user access to the functions of the UE 1202. The UE 1202 illustrated in FIG. 12 is a functional block diagram rather than a listing of specific components.

Figure 13:
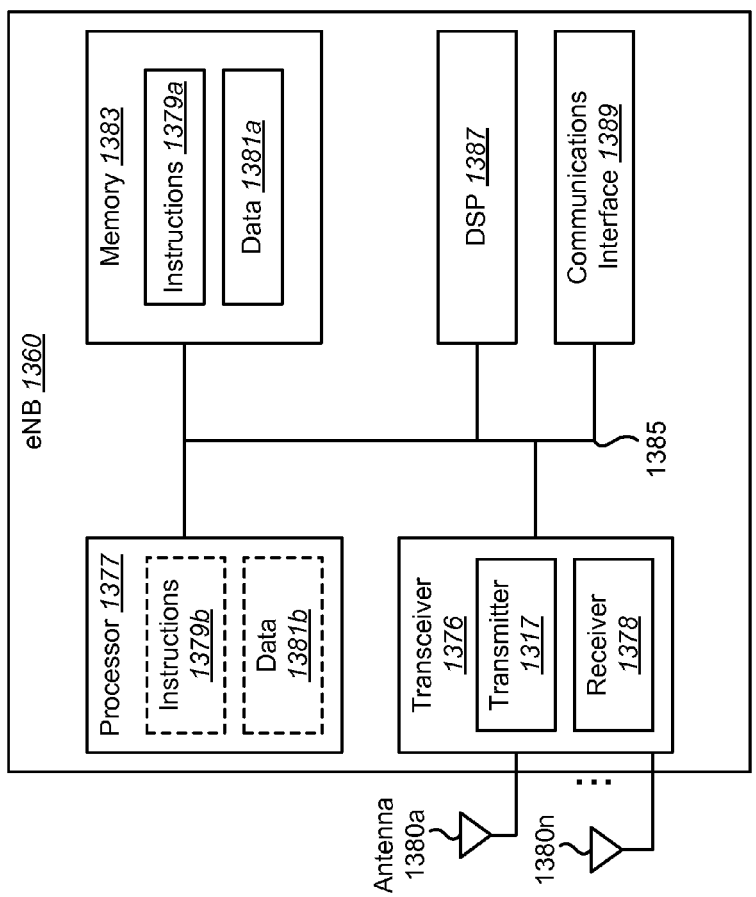
FIG. 13 illustrates various components that may be utilized in an eNB.

FIG. 13 illustrates various components that may be utilized in an eNB 1360. The eNB 1360 described in connection with FIG. 13 may be implemented in accordance with the eNB 160 described in connection with FIG. 1. The eNB 1360 includes a processor 1377 that controls operation of the eNB 1360. The processor 1377 may also be referred to as a central processing unit (CPU). Memory 1383, which may include read-only memory (ROM), random access memory (RAM), a combination of the two or any type of device that may store information, provides instructions 1379*a* and data 1381*a* to the processor 1377. A portion of the memory 1383 may also include non-volatile random access memory (NVRAM). Instructions 1379*b* and data 1381*b* may also reside in the processor 1377. Instructions 1379*b* and/or data 1381*b* loaded into the processor 1377 may also include instructions 1379*a* and/or data 1381*a* from memory 1383 that were loaded for execution or processing by the processor 1377. The instructions 1379*b* may be executed by the processor 1377 to implement the method 300 described above.

The eNB 1360 may also include a housing that contains one or more transmitters 1317 and one or more receivers 1378 to allow transmission and reception of data. The transmitter(s) 1317 and receiver(s) 1378 may be combined into one or more transceivers 1376. One or more antennas 1380*a-n* are attached to the housing and electrically coupled to the transceiver 1376.

The various components of the eNB 1360 are coupled together by a bus system 1385, which may include a power bus, a control signal bus and a status signal bus, in addition to a data bus. However, for the sake of clarity, the various buses are illustrated in FIG. 13 as the bus system 1385. The eNB 1360 may also include a digital signal processor (DSP) 1387 for use in processing signals. The eNB 1360 may also include a communications interface 1389 that provides user access to the functions of the eNB 1360. The eNB 1360 illustrated in FIG. 13 is a functional block diagram rather than a listing of specific components.

Figure 14:
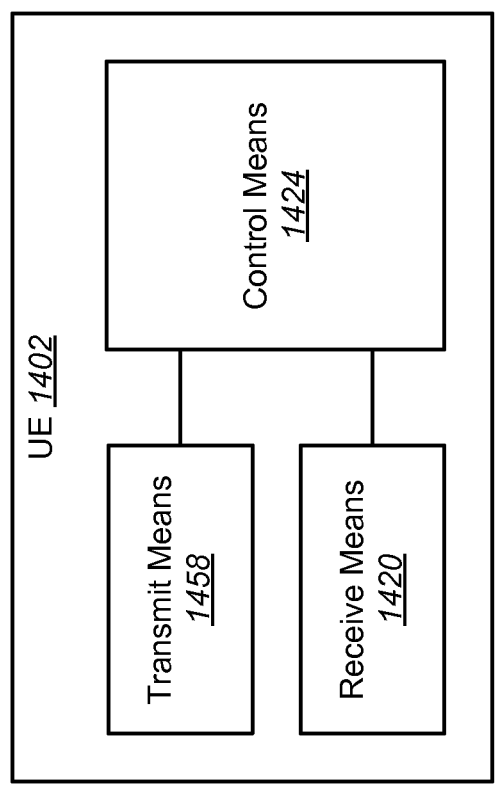
FIG. 14 is a block diagram illustrating one configuration of a UE in which systems and methods for sending HARQ information for carrier aggregation may be implemented.

FIG. 14 is a block diagram illustrating one configuration of a UE 1402 in which systems and methods for sending HARQ information for carrier aggregation may be implemented. The UE 1402 includes transmit means 1458, receive means 1420 and control means 1424. The transmit means 1458, receive means 1420 and control means 1424 may be configured to perform one or more of the functions described in connection with FIG. 2 and FIG. 12 above. FIG. 12 above illustrates one example of a concrete apparatus structure of FIG. 14. Other various structures may be implemented to realize one or more of the functions of FIG. 2 and FIG. 12. For example, a DSP may be realized by software.

Figure 15:
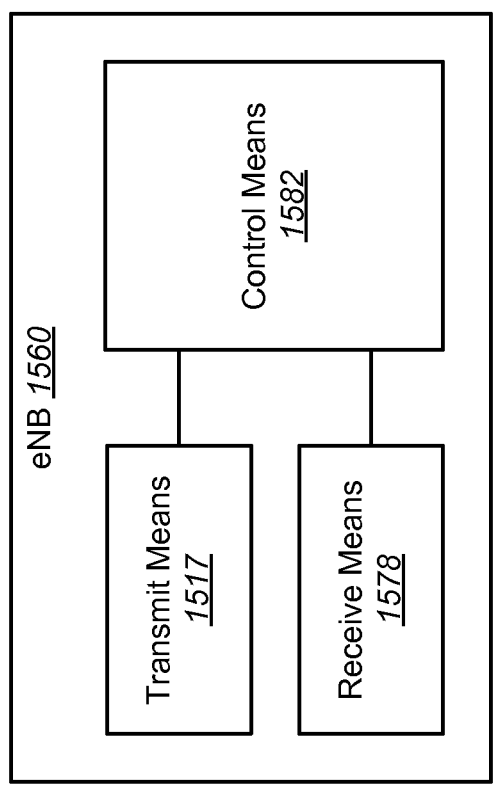
FIG. 15 is a block diagram illustrating one configuration of an eNB in which systems and methods for receiving HARQ information for carrier aggregation may be implemented.

FIG. 15 is a block diagram illustrating one configuration of an eNB 1560 in which systems and methods for receiving HARQ information for carrier aggregation may be implemented. The eNB 1560 includes transmit means 1517, receive means 1578 and control means 1582. The transmit means 1517, receive means 1578 and control means 1582 may be configured to perform one or more of the functions described in connection with FIGS. 3 and 13 above. FIG. 13 above illustrates one example of a concrete apparatus structure of FIG. 15. Other various structures may be implemented to realize one or more of the functions of FIGS. 3 and 13. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A User Equipment (UE) for sending Hybrid Automatic Repeat Request (HARQ) information, comprising:
    a processor;
    memory in electronic communication with the processor;
    instructions stored in the memory, the instructions being executable to:
        determine a primary cell (PCell) uplink-downlink (UL-DL) configuration;
        receive a first Physical Downlink Shared Channel (PDSCH) on the PCell in a first subframe;
        determine a first HARQ Acknowledgement (HARQ-ACK) reporting subframe based on PCell downlink associations and a subframe number of the first subframe, the PCell downlink associations depending on the PCell UL-DL configuration;
        send first HARQ-ACK information on the PCell, which corresponds to the PDSCH on the PCell, in the first HARQ-ACK reporting subframe;
        receive a second PDSCH on a secondary cell (SCell) in a second subframe;
        determine a second HARQ-ACK reporting subframe based on SCell downlink associations and a subframe number of the second subframe, the SCell downlink associations depending on the PCell UL-DL configuration; and
        send second HARQ-ACK information on the PCell, which corresponds to the second PDSCH on the SCell, in the second HARQ-ACK reporting subframe,
        wherein the SCell downlink associations are obtained by adding, to the PCell downlink associations, a downlink association related to a subframe number in which the PCell UL-DL configuration specifies UL.

2. The UE of claim 1, wherein the instructions are further executable to determine the second HARQ-ACK reporting subframe based on a selected SCell downlink association and a subframe number of the second subframe if the PCell UL-DL configuration specifies UL for the second subframe.

3. The UE of claim 1, wherein the instructions are further executable to generate SCell PDSCH HARQ-ACK information as the second HARQ-ACK information corresponding to the second subframe.

4. The UE of claim 1, wherein an SCell and a PCell comprise aggregated carriers.

5. An evolved Node B (eNB) for receiving Hybrid Automatic Repeat Request (HARQ) information, comprising:
    a processor;
    memory in electronic communication with the processor;
    instructions stored in the memory, the instructions being executable to:
        determine a primary cell (PCell) uplink-downlink (UL-DL) configuration corresponding to a User Equipment (UE);
        transmit a first Physical Downlink Shared Channel (PDSCH) on the PCell in a first subframe;
        determine a first HARQ Acknowledgement (HARQ-ACK) reporting subframe based on PCell downlink associations and a subframe number of the first subframe, the PCell downlink associations depending on the PCell UL-DL configuration;
        receive first HARQ-ACK information on the PCell, which corresponds to the PDSCH on the PCell, in the first HARQ-ACK reporting subframe;
        transmit a second on a secondary cell (SCell) in a second subframe;
        determine a second reporting subframe based on SCell downlink associations and a subframe number of the second subframe, the SCell downlink associations depending on the PCell UL-DL configuration; and
        receive second HARQ-ACK information on the PCell, which corresponds to the second PDSCH on the SCell, in the second HARQ-ACK reporting subframe,
        wherein the SCell downlink associations are obtained by adding, to the PCell downlink associations, a downlink association related to a subframe number in which the PCell UL-DL configuration specifies UL.

6. The eNB of claim 5, wherein the instructions are further executable to determine the second HARQ-ACK reporting subframe based on a selected SCell downlink association and a subframe number of the second subframe if the PCell UL-DL configuration specifies UL for the second subframe.

7. The eNB of claim 5, wherein an SCell and a PCell comprise aggregated carriers.

8. A method in a User Equipment (UE) for sending Hybrid Automatic Repeat Request (HARQ) information, the method comprising:
    determining a primary cell (PCell) uplink-downlink (UL-DL) configuration;
    receiving a first Physical Downlink Shared Channel (PDSCH) on the PCell in a first subframe;
    determining a first HARQ Acknowledgement (HARQ-ACK) reporting subframe based on PCell downlink associations and a subframe number of the first subframe, the PCell downlink associations depending on the PCell UL-DL configuration;
    sending first HARQ-ACK information on the PCell, which corresponds to the PDSCH on the PCell, in the first HARQ-ACK reporting subframe;
    receiving a second PDSCH on a secondary cell (SCell) in a second subframe;

determining a second reporting subframe based on SCell downlink associations and a subframe number of the second subframe, the SCell downlink associations depending on the PCell UL-DL configuration; and sending second HARQ-ACK information on the PCell, which corresponds to the second PDSCH on the SCell, in the second HARQ-ACK reporting subframe, wherein the SCell downlink associations are obtained by adding, to the PCell downlink associations, a downlink association related to a subframe number in which the PCell UL-DL configuration specifies UL.

9. A method in an evolved Node B (eNB) for receiving Hybrid Automatic Repeat Request (HARQ) information, the method comprising:

determining a primary cell (PCell) uplink-downlink (UL-DL) configuration corresponding to a User Equipment (UE);

transmitting a first Physical Downlink Shared Channel (PDSCH) on the PCell in a first subframe;

determining a first HARQ Acknowledgement (HARQ-ACK) reporting subframe based on PCell downlink associations and a subframe number of the first subframe, the PCell downlink associations depending on the PCell UL-DL configuration;

receiving first HARQ-ACK information on the PCell, which corresponds to the PDSCH on the PCell, in the first HARQ-ACK reporting subframe;

transmitting a second PDSCH on a secondary cell (SCell) in a second subframe;

determining a second HARQ-ACK reporting subframe based on SCell downlink associations and a subframe number of the second subframe, the SCell downlink associations depending on the PCell UL-DL configuration; and receiving second HARQ-ACK information on the PCell, which corresponds to the second PDSCH on the SCell, in the second HARQ-ACK reporting subframe, wherein the SCell downlink associations are obtained by adding, to the PCell downlink associations, a downlink association related to a subframe number in which the PCell UL-DL configuration specifies UL.

* * * * *